(12) United States Patent
Vermaelen et al.

(10) Patent No.: US 12,396,459 B2
(45) Date of Patent: Aug. 26, 2025

(54) SYNERGISTICALLY EFFECTIVE HERBICIDE COMPOSITION COMPRISING PYRIDATE AND AT LEAST ONE DEFINED 4-HPPD INHIBITOR

(71) Applicant: BELCHIM CROP PROTECTION NV, Londerzeel (BE)

(72) Inventors: Jan Vermaelen, Londerzeel (BE); Pieter Vanhassel, Londerzeel (BE); Gilles Deschomets, Londerzeel (BE)

(73) Assignee: BELCHIM CROP PROTECTION NV, Londerzeel (BE)

( * ) Notice: Subject to any disclaimer, the term of this patent is extended or adjusted under 35 U.S.C. 154(b) by 750 days.

(21) Appl. No.: 17/263,342

(22) PCT Filed: Jul. 30, 2019

(86) PCT No.: PCT/EP2019/070514
§ 371 (c)(1),
(2) Date: Jan. 26, 2021

(87) PCT Pub. No.: WO2020/025619
PCT Pub. Date: Feb. 6, 2020

(65) Prior Publication Data
US 2021/0219553 A1      Jul. 22, 2021

(30) Foreign Application Priority Data
Jul. 31, 2018   (EP) .................................... 18186490

(51) Int. Cl.
| *A01N 47/06* | (2006.01) |
| *A01N 25/24* | (2006.01) |
| *A01N 25/32* | (2006.01) |
| *A01N 41/10* | (2006.01) |
| *A01N 43/80* | (2006.01) |
| *C05G 3/60*  | (2020.01) |

(52) U.S. Cl.
CPC ............. *A01N 47/06* (2013.01); *A01N 25/24* (2013.01); *A01N 25/32* (2013.01); *A01N 41/10* (2013.01); *A01N 43/80* (2013.01); *C05G 3/60* (2020.02)

(58) Field of Classification Search
CPC ........ A01N 47/06; A01N 25/24; A01N 25/32; A01N 41/10; A01N 43/80; A01N 43/40; C05G 3/60
See application file for complete search history.

(56) References Cited

U.S. PATENT DOCUMENTS

| 2010/0285961 A1 | 11/2010 | Hacker |
| 2011/0263427 A1 | 10/2011 | Kikugawa |
| 2019/0021326 A1* | 1/2019 | Stratmann .............. A01N 43/58 |

FOREIGN PATENT DOCUMENTS

| WO | 2020025619 A1 | 2/2020 |

OTHER PUBLICATIONS

Owen et al. (Weed Science Program 2017 Weed Control Results, Iowa State University, Department of Agronomy). (Year: 2017).*
ISR-WO for PCT/EP2019/070514(parent to this application) dated Aug. 5, 2019.
D.L. Siehl, "Broad 4-Hydroxyphenylpyruvate Dioxygenase Inhibitor Herbicide Tolerance in Soybean with an Optimized Enzyme and Expression Cassette," Plant Physiology, vol. 166, No. 3, Sep. 5, 2014.
BASF, Safety Data Sheet Armezon Pro (2017) retrieved from https://agriculture.basf.us/content/dam/cxm/agriculture/crop-protection/products/documents/MSDS_000000000030652720_en.pdf.

* cited by examiner

*Primary Examiner* — Robert A Wax
*Assistant Examiner* — John Seungjai Kwon
(74) *Attorney, Agent, or Firm* — Vorys, Sater, Seymour and Pease LLP

(57) ABSTRACT

The current invention concerns a synergistically effective herbicide composition comprising as component (A) an herbicidally active amount of pyridate and as component (B) at least one 4-HPPD inhibitor selected from the group comprising triketones, pyrazolones, isoxazoles and other 4-HPPD inhibitors, wherein a weight ratio of components (A) and (B) is in a range up to 1000:1.
The invention further concerns a kit comprising pyridate and at least one 4-HPPD inhibitor and a use of a herbicide composition according to the invention in an amount effective for controlling one or more types of unwanted vegetation by applying the herbicide composition to the unwanted vegetation and/or a habitat thereof.

8 Claims, No Drawings

SYNERGISTICALLY EFFECTIVE HERBICIDE COMPOSITION COMPRISING PYRIDATE AND AT LEAST ONE DEFINED 4-HPPD INHIBITOR

TECHNICAL FIELD

The invention relates to a synergistically effective herbicide composition comprising pyridate and at least one defined 4-HPPD inhibitor, to a kit comprising pyridate and at least one defined 4-HPPD inhibitor and to a use of a herbicide composition according to the invention for controlling one or more types of unwanted vegetation.

BACKGROUND

In crop protection, it is in principle desirable to increase the specific action of a herbicidally active substance and the safety of operation. The herbicidal activity of many herbicides against unwanted vegetation is already on a high level, but generally depends on the application rate, the respective preparation form, the respective unwanted vegetation to be controlled or the spectrum of unwanted vegetation, the climatic and soil conditions, etc. Thus, there is frequently a need for targeted synergistic activity against specific species of unwanted vegetation, control of unwanted vegetation with better overall selectivity, generally lower amounts of active compounds used for equally good control results and for a reduced active compound input into the environment to avoid, for example, leaching and carry-over effects. However, in the combined use of a plurality of active compounds, there are frequently phenomena of chemical, physical or biological incompatibility, for example decomposition of an active compound or antagonism in the biological activity of the active compounds.

The present invention aims to resolve at least some of the problems mentioned above. It is furthermore an object of the present invention to provide herbicide compositions as alternatives to the prior art, or as an improvement thereof.

SUMMARY OF THE INVENTION

A first aspect of the present invention provides a synergistically effective herbicide composition.

In the herbicide composition according to the first aspect of the present invention, at least one 4-HPPD inhibitor has shown an unexpected increase in herbicidal activity when combined with pyridate. This increase in herbicidal activity is caused by a synergistic effect when combining pyridate and at least one 4-HPPD inhibitor according to a weight ratio according to the first aspect of the present invention.

A second aspect of the present invention provides a kit.

A third aspect of the present invention provides a use.

DETAILED DESCRIPTION OF THE INVENTION

The recitation of numerical ranges by one or two endpoints includes all numbers and fractions subsumed within that range, as well as the recited one or two endpoints.

The term "unwanted vegetation", as used herein, refers to all plants, such as, for example, broad-leaved weeds, weed grasses or Cyperaceae, which grow at sites where they are unwanted.

The terms "phenyl-pyridazines" and "phenyl-pyridazine herbicides", as used herein, are synonyms, and include selective herbicides for controlling unwanted vegetation belonging to the C3 classification according to the Herbicide Resistance Action Committee (HRAC) (http://www.hracglobal.com). Phenyl-pyridazines belong to the class of the photo system II inhibitors. The class of phenyl-pyridazines includes pyridate and pyridafol, and derivatives or salts thereof.

As used herein, the term "photo-system II inhibitors" refers to chemical compounds which have a herbicidal activity by inhibiting the photosynthesis process at the level of the photo system II in plants. In particular, photo system II inhibitors bind to the D1 protein of photo system II and thereby inhibit the binding of quinone to the D1 protein of photo system II whereby electrons accumulate in chlorophyll molecules and an excess of oxidation occurs, causing the plant to die. The class of substances of the photo-system II inhibitors include triazinone herbicides, urea herbicides, phenylcarbamate herbicides, triazolinone herbicides, nitrile herbicides, amide herbicides, benzothiadiazinone herbicides, phenyl-pyridazine herbicides, and derivatives or salts thereof.

As used herein, the term "4-HPPD inhibitors" refers to a group of herbicides that indirectly inhibit phytoene desaturase by inhibiting synthesis of plastoquinone (PQ), an essential cofactor for the desaturase. 4-Hydroxyphenylpyruvate dioxygenase (4-HPPD; EC 1.13.11.27) is an enzyme that is involved in the metabolic pathway for the synthesis of plastoquinone from tyrosine. This takes place in the chloroplast and is the same pathway that leads to biosynthesis of a-tocopherol, a powerful antioxidant. PQ is not only an essential cofactor for phytoene desaturase but is also an essential carrier of protons and electrons in the thylakoid membrane. Hence, 4-HPPD inhibitors not only indirectly inhibit phytoene desaturase, but may also disrupt thylakoid membrane function and reduce protection from damage by AOS. The group of 4-HPPD inhibitors includes selective herbicides for controlling unwanted vegetation belonging to the F2 classification according to the Herbicide Resistance Action Committee (HRAC) (http://www.hracglobal.com). 4-HPPD inhibitors belong to the class of herbicides inhibiting pigment synthesis, also called bleaching herbicides. The group of 4-HPPD inhibitors includes triketones, isoxazoles and pyrazoles. Examples of chemical substances of the group of 4-HPPD inhibitors include triketones, pyrazolones, isoxazoles and other 4-HPPD inhibitors. The group of triketones includes, yet is not limited to, mesotrione, sulcotrione, tembotrione and tefuryltrione. The group of pyrazolones includes, yet is not limited to, pyrazoxyfen, pyrazolynate, benzofenap, pyrasulfotole, topramezone and tolpyralate. The group of isoxazoles includes, yet is not limited to, isoxaflutole and isoxachlortole. The so-called group of "other 4-HPPD inhibitors" includes, yet is not limited to, benzobycyclon and bicyclopyrone.

The term 'safener', as used in this text, is to be understood as a compound or a mixture of compounds which compensates for, or reduces, the phytotoxic properties of a herbicide towards useful plants without substantially reducing the herbicidal action against unwanted vegetation.

The herbicidal activity of herbicides comprising pyridate or pyridate herbicides against unwanted vegetation (among which broad-leaved weeds, weed grasses, cyperaceae) is already on a high level, but generally depends on the application rate, the respective preparation form, the respective unwanted vegetation to be controlled or the spectrum of unwanted vegetation, the climatic and soil conditions, etc. Further criteria in this context are duration of action, or the breakdown rate, of the herbicide, the general crop plant compatibility and speed of action (more rapid onset of action), the activity spectrum and behavior toward follower crops (replanting problems) or the general flexibility of application (control of unwanted vegetation in their various growth stages). If appropriate, changes in the susceptibility of unwanted vegetation, which may occur on prolonged use of the herbicides or in limited geographical regions (control of tolerant or resistant species of unwanted vegetation), may also have to be taken into account. The compensation of losses in action in the case of individual plants of unwanted vegetation by increasing the application rates of the herbicides is only possible to a certain degree, for example because such a procedure reduces the selectivity of the herbicides or because the action is not improved, even when applying higher rates.

Thus, there is frequently a need for targeted synergistic activity against specific species of unwanted vegetation, control of unwanted vegetation with better overall selectivity, generally lower amounts of active compounds used for equally good control results and for a reduced active compound input into the environment to avoid, for example, leaching and carry-over effects. There is also a need for control of species which were as yet uncontrolled (gaps) and for control of species which are tolerant or resistant to individual herbicides or to a number of herbicides. There is also a need for developing one-shot applications to avoid labor-intensive multiple applications, and also to develop systems for controlling the rate of action, where, in addition to an initial rapid control of unwanted vegetation, there is also a slow, residual control.

A possible solution to the problems mentioned above may be to provide combined herbicide compositions, that is combinations of a plurality of herbicides and/or other components from the group of the agrochemically active compounds of a different type and of formulation auxiliaries and additives customary in crop protection which contribute the desired additional properties. However, in the combined use of a plurality of active compounds, there are frequently phenomena of chemical, physical or biological incompatibility, for example decomposition of an active compound or antagonism in the biological activity of the active compounds. For these reasons, potentially suitable combinations of active compounds have to be selected in a targeted manner and tested experimentally for their suitability, it not being possible to safely discount a priori negative or positive results.

A first aspect of the present invention provides a synergistically effective herbicide composition comprising as component (A) an herbicidally active amount of pyridate and as component (B) at least one 4-HPPD inhibitor selected from the group comprising triketones, pyrazolones, isoxazoles and other 4-HPPD inhibitors, wherein a weight ratio of components (A) and (B) is in a range up to 1000:1, more preferably 10 up to 900:1, more preferably up to 800:1, more preferably up to 700:1, more preferably up to 600:1, more preferably up to 500:1, even more preferably up to 400:1, even more preferably up to 300:1, even more preferably up to 200:1, even more preferably up to 180:1, even more preferably up to 160:1, even more preferably up to 140:1 and yet even more preferably up to 120:1. In a preferred embodiment, said weight ratio of components (A) and (B) is in a range up to 100:1, more preferably up to 80:1, even more preferably up to 70:1 and yet even more preferably up to 60:1. In a preferred embodiment, said weight ratio of components (A) and (B) is in a range from 0.1:1 to 50:1, more preferably from 0.2:1 to 46:1, even more preferably from 0.3:1 to 43:1, yet even more preferably from 0.4:1 to 40:1, and most preferably from 0.6:1 to 37:1. In a preferred embodiment, said weight ratio of components (A) and (B) is in a range from 1:1 to 32:1, more preferably from 1,2:1 to 30:1, even more preferably from 1,4:1 to 28:1, even more preferably from 1,6:1 to 26:1, even more preferably from 1,8:1 to 24:1 and yet even more preferably from 2:1 to 22:1. According to a preferred embodiment, said triketones are selected from the group comprising mesotrione, sulcotrione, tembotrione and tefuryltrione. According to a preferred embodiment, said pyrazolones are selected from the group comprising pyrazoxyfen, pyrazolynate, benzofenap, pyrasulfotole, topramezone and tolpyralate. According to a preferred embodiment, said isoxazoles are selected from the group comprising isoxaflutole and isoxachlortole. According to a preferred embodiment, said "other 4-HPPD inhibitors" are selected from the group comprising benzobycyclon and bicyclopyrone.

According to a preferred embodiment of the first aspect of the present invention, said at least one 4-HPPD inhibitor is selected from the group consisting of mesotrione, topramezone, tembotrione and sulcotrione. In a preferred embodiment, the herbicide composition comprises as component (A) an herbicidally active amount of pyridate and as component (B) mesotrione, wherein a weight ratio of components (A) and (B) is in a range from 0.1:1 to 35:1, more preferably from 0.5 to 31:1, even more preferably from 0.9:1 to 27:1, yet even more preferably from 1.3:1 to 1.7:1 and most preferably from 2.1:1 to 21:1. In a preferred embodiment, the herbicide composition comprises as component (A) an herbicidally active amount of pyridate and as component (B) topramezone, wherein a weight ratio of components (A) and (B) is in a range from 22:1 to 50:1, more preferably from 25:1 to 47:1, even more preferably from 28:1 to 44:1, even more preferably from 31:1 to 41:1, yet even more preferably from 34:1 to 38:1 and most preferably from 35:1 to 37:1. In a preferred embodiment, the herbicide composition comprises as component (A) an herbicidally active amount of pyridate and as component (B) tembotrione, wherein a weight ratio of components (A) and (B) is in a range from 2:1 to 25:1, more preferably from 4:1 to 22:1, even more preferably from 6:1 to 19:1, even more preferably from 8:1 to 17:1, yet even more preferably from 9:1 to 15:1 and most preferably from 10:1 to 13:1. In a preferred embodiment, the herbicide composition comprises as component (A) an herbicidally active amount of pyridate and as component (B) sulcotrione, wherein a weight ratio of components (A) and (B) is in a range from 0.1:1 to 25:1, more preferably from 0.2:1 to 5:1, even more preferably from 0.5:1 to 3:1, yet even more preferably from 0.6:1 to 2.5:1 and most preferably from 0.67:1 to 2:1.

The herbicide composition according to the first aspect of the invention may contain an additional herbicide. In a preferred embodiment of the invention, the herbicide composition according to the first aspect of the present invention comprises pyridate, mesotrione and S-metolachlor. In another preferred embodiment of the invention, the herbicide composition according to the first aspect of the present invention comprises pyridate, mesotrione and nicosulfuron.

In the herbicide composition according to the first aspect of the present invention, at least one 4-HPPD inhibitor has shown an unexpected increase in herbicidal activity when combined with pyridate. This increase in herbicidal activity is caused by a synergistic effect when combining pyridate and at least one 4-HPPD inhibitor according to said weight ratio. Pyridate and at least one 4-HPPD inhibitor interact in a particularly favorable manner, for example when they are employed for controlling unwanted vegetation in sown and/or planted crop plants, greens/lawns, in fruit plantations (plantation crops) or on non-crop areas (e.g. amenity areas such as squares of residential areas or industrial sites, rail tracks). Surprisingly, the activity of the combination according to the invention of two active compounds, when used against unwanted vegetation, is higher than the activities of the individual components. A true synergistic effect which could not have been predicted therefore exists, not just a complementation of action (additive effect). For controlling unwanted vegetation, it is particularly advantageous to apply said herbicide composition according to the first aspect of the present invention in diluted form in water.

The synergistic effect permits a reduction of the application rates of the individual herbicides pyridate and at least one 4-HPPD inhibitor, a higher and/or longer efficacy at the same application rate, the control of species which were as yet uncontrolled (gaps), control of species which are tolerant or resistant to individual herbicides or to a number of herbicides, an extension of the period of application and/or a reduction in the number of individual applications required and—as a result for the user—unwanted vegetation control systems which are more advantageous economically and ecologically.

Pyridate (IUPAC name: (6-chloro-3-phenylpyridazin-4-yl) octylsulfanylformate) is a chemical compound from the group of phenyl-pyridazines and belongs to the class of the photo system II inhibitors. Its herbicidal activity is described in The Pesticide Manual, Fifteenth Edition, 2009. Exemplary uses of pyridate include its use for post-emergence control of annual broad-leaved weeds and grass weeds, e.g., in maize, sweet corn, oilseed rape, cereals, rice, peanuts and vegetables.

Mesotrione (IUPAC name: 2-(4-methylsulfonyl-2-nitrobenzoyl) cyclohexane-1,3-dione) is a triketone compound from the group of 4-HPPD inhibitors and belongs to the class of herbicides inhibiting pigment synthesis, also called bleaching herbicides. Mesotrione is a synthetic analog of leptospermone developed to mimic the effects of this natural herbicide. Mesotrione can be used for pre-emergence and/or post-emergence control of several types of unwanted vegetation, such as broadleaf weeds, e.g., in maize.

Topramezone (IUPAC name: 4-[3-(4,5-dihydro-1,2-oxazol-3-yl)-2-methyl-4-methylsulfonylbenzoyl]-2-methyl-1H-pyrazol-3-one) is a pyrazolone compound from the group of -HPPD inhibitors and belongs to the class of herbicides inhibiting pigment synthesis, also called bleaching herbicides. Topramezone can be used for post-emergence control of several types of unwanted vegetation, such as broadleaf weeds and weed grasses, e.g., in maize or soy.

Tembotrione (IUPAC name: 2-[2-chloro-4-methylsulfonyl-3-(2,2,2-trifluoroethoxymethyl)benzoyl]cyclohexane-1, 3-dione) is a triketone compound from the group of -HPPD inhibitors and belongs to the class of herbicides inhibiting pigment synthesis, also called bleaching herbicides. Tembotrione can be used for post-emergence control of several types of unwanted vegetation, such as broadleaf weeds and weed grasses, e.g., in maize.

Sulcotrione (IUPAC name: 2-[2-Chloro-4-(methylsulfonyl)benzoyl]cyclohexane-1,3-dione is a triketone compound from the group of -HPPD inhibitors and belongs to the class of herbicides inhibiting pigment synthesis, also called bleaching herbicides. Sulcotrione can be used for post-emergence control of various types of weeds, grasses (Poaceae), and woody plants.

In this text, salts and/or derivatives of pyridate and/or at least one 4-HPPD inhibitor are also falling within the above definitions of pyridate and at least one 4-HPPD inhibitor. Any salt is possible as long as it is agriculturally acceptable. Examples thereof include alkali metal salts such as a sodium salt and a potassium salt, alkaline earth metal salts such as a magnesium salt and a calcium salt, ammonium salts such as a monomethylammonium a salt, dimethylammonium salt and triethylammonium salt, inorganic acid salts such as a hydrochloride, a perchlorate, a sulfate and a nitrate salt, and organic acid salts such as an acetate and a methanesulfonate salt. Mesotrione may also be used in the form of a metal chelate, such as a copper chelate.

Although pyridate has proven most efficiently in the herbicide composition according to the first aspect of the present invention, alternative embodiments provide other herbicide compositions that are formulated by applying at least one other phenyl-pyridazine herbicide in addition to or instead of pyridate. Relative amounts of such phenyl-pyridazine herbicide with regard to mesotrione, topramezone tembotrione and/or sulcotrione, and/or alternative 4-HPPD inhibitors, may be included within the ranges disclosed above, or may be situated within other or broader ranges. Said at least one other phenyl-pyridazine herbicide is preferably pyridafol or a derivative or salt thereof.

Although mesotrione, topramezone, tembotrione and/or sulcotrione have proven most efficiently in the herbicide composition according to the first aspect of the present invention, alternative embodiments provide other herbicide compositions that are formulated by applying at least one other 4-HPPD inhibitor in addition to or instead of mesotrione, topramezone, tembotrione and/or sulcotrione. Relative amounts of such 4-HPPD inhibitors with regard to pyridate, and/or alternative phenyl-pyridazine herbicides, may be included within the ranges disclosed above, or may be situated within other or broader ranges. Said at least one other 4-HPPD inhibitor is preferably selected from the group comprising pyrazoxyfen, pyrazolynate, isoxaflutole, benzofenap, pyrasulfotole, isoxachlortole, benzobicyclon, bicyclopyrone, tefuryltrione, tolpyralate and derivatives or salts thereof.

The herbicide composition according to the first aspect of the present invention can be used to control the growth of unwanted vegetation, such as weeds, by pre- or post-emergence application, including both early and later after emergence. The combined application described above can offer both leaf and residual action. Herein, the term "leaf action" refers to herbicidal activity obtained by application to above-ground or exposed portions of the unwanted vegetation that have risen above the surface of a soil. By the term "residual action", herbicide action is meant to be obtained some time after application to the soil through which seedlings present at the time of application or which germinate after application are controlled.

The term "post-emergence application" refers to the application to the aboveground or exposed portions of the unwanted vegetation that have risen above the surface of the earth. The term "pre-emergence application" refers to the application on the soil in which the unwanted vegetation seeds and/or seedlings are present before the emergence of the unwanted vegetation above the surface of said soil. It will be clear that the use of a herbicide composition according to the first aspect of the present invention can be applied before and after emergence of unwanted vegetation and before and after emergence of a cultivated crop.

When one or more of the components of the herbicide composition are less well tolerated by certain crop plants, application techniques can be employed in which the herbicide composition is sprayed, using spray equipment, in such a way that the leaves of the sensitive crop plants are contacted minimally by the one or more components while the herbicide composition reaches the leaves of unwanted vegetation growing underneath, or the bare surface.

Said synergistic effect of pyridate and at least one 4-HPPD inhibitor can be observed, for example, in the case of a ready-mix application, of, for example, a ready-to-use (RTU) formulation, emulsifiable concentrate (EC) formulation, microemulsifiable concentrate, suspension concentrate (SC) formulation, oil dispersion (OD) formulation, soluble liquid (SL) formulation, wettable powder (WP) formulation, water dispersible granule (WG), water soluble granule (SG) formulation, and in the case of a tank mix; however, they can also be observed when the active compounds are applied at different times (splitting) (packed, for example, as combi-pack or monodoses). It is also possible to apply the herbicides or the herbicide composition in a plurality of portions (sequential application), for example post-emergence applications or early post-emergence applications followed by medium or late post-emergence applications. If pyridate and at least one 4-HPPD inhibitor are to be applied as a tank mix, it has to be ensured that an obtained spray liquor is applied relatively quickly after preparation.

According to embodiments of the first aspect of the present invention, the herbicide components pyridate and at least one 4-HPPD inhibitor may be formulated together in an appropriate ratio of the present invention (combination formulation), together with conventional formulation aids as known in the art, such as, for example, one or more carriers.

In a preferred embodiment, the herbicide composition according to the first aspect of the present invention further comprises one or more additional components selected from the group comprising other pesticides such as herbicides, insecticides, fungicides or other active pesticide ingredients, safeners, antioxidants, chemical stabilizers, adhesives, fertilizers, perfumes, colorants, liquid carriers, solid carriers, surface-active agents, crystallisation inhibitors, viscosity modifiers, suspending agents, spray droplet modifiers, pigments, foaming agents, light-blocking agents, compatibility agents, antifoam agents, sequestering agents, neutralising agents and buffers, wetting and dispersing agents, preservatives, thickening agents, corrosion inhibitors, freezing point depressants, odorants, spreading agents, penetration aids, micronutrients, emollients, lubricants, sticking agents and humectants, such as, for example, propylene glycol. According to preferred embodiments, the herbicide composition can also comprise various agrochemically active compounds, for example from the group of the acaricides, nematicides, bird repellants, and soil structure improvers.

Non-limiting examples of colorants include inorganic pigments such as iron oxide, titanium oxide and Prussian blue and/or organic dyes such as alizarin dyes, azo dyes and metal phthalocyanine, and trace elements such as iron, manganese, boron, copper, cobalt, molybdenum and zinc.

In a preferred embodiment, said one or more additional herbicides are selected from the group comprising acetochlor, acifluorfen, aclonifen, acrolein, AKH-7088, alachlor, alloxydim, ametryn, amicarbazone, amidosulfuron, amitrole, ammonium sulfamate, anilofos, asulam, atrazine, azafenidin, azimsulfuron, BAS 625 H, beflubutamid, benazolin, benfluralin, benfuresate, bensulfuron-methyl, bensulide, bentazone, bifenox, bilanafos, bispyribac-sodium, borax, bromacil, bromobutide, bromoxynil, butachlor, butafenacil, butamifos, butralin, butroxydim, butylate, cafenstrole, carbetamide, carfentrazone-ethyl, chloramben, chlorbromuron, chlorflurenol-methyl, chloridazon, chlorimuron-ethyl, chloroacetic acid, chlorotoluron, chlorpropham, chlorsulfuron, chlorthal-dimethyl, chlorthiamid, cinidon-ethyl, cinmethylin, cinosulfuron, clethodim, clodinafop-propargyl, clomazone, clomeprop, clopyralid, cloransulam-methyl, cumyluron, cyanazine, cycloate, cyclosulfamuron, cycloxydim, cyhalofop-butyl, 2,4-D, daimuron, dalapon, dazomet, 2,4-DB, desmedipham, dicamba, dichlobenil, dichlorprop, dichlorprop-P, diclofop-methyl, diclosulam, difenzoquat metilsulfate, diflufenican, diflufenzopyr, dimefuron, dimepiperate, dimethachlor, dimethametryn, dimethenamid, dimethipin, dimethylarsinic acid, dinitramine, dinoterb, diphenamid, diquat dibromide, dithiopyr, diuron, DNOC, endothal, EPTC, esprocarb, ethalfluralin, ethametsulfuron-methyl, ethofumesate, ethoxysulfuron, etobenzanid, fenoxaprop-P-ethyl, fentrazamide, fenuron, ferrous sulfate, flamprop-M, flazasulfuron, florasulam, fluazifop-butyl, fluazifop-P-butyl, fluazolate, flucarbazone-sodium, fluchloralin, flufenacet, flumetsulam, flumiclorac-pentyl, flumioxazin, fluometuron, fluoroglycofen-ethyl, flupropanate, flupyrsulfuron-methyl-sodium, flurenol, fluridone, flurochloridone, fluroxypyr, flurtamone, fluthiacet-methyl, fomesafen, fosamine, glufosinate-ammonium, glyphosate, halauxyfen, halauxyfen-methyl, halosulfuron-methyl, haloxyfop, HC-252, hexazinone, imazamethabenz-methyl, imazamox, imazapic, imazapyr, imazaquin, imazethapyr, imazosulfuron, indanofan, iodosulfuron-methyl-sodium, ioxynil, isoproturon, isouron, isoxaben, lactofen, lenacil, linuron, MCPA, MCPA-thioethyl, MCPB, mecoprop, mecoprop-P, mefenacet, mefluidide, metam, metamitron, metazachlor, methabenzthiazuron, methylarsonic acid, methyldymron, methyl isothiocyanate, metobenzuron, metobromuron, metolachlor, S-metolachlor, metosulam, metoxuron, metribuzin, metsulfuron-methyl, MK-616, MKH 6561, molinate, monolinuron, naproanilide, napropamide, naptalam, neburon, nicosulfuron, nonanoic acid, norflurazon, oleic acid (fatty acids), orbencarb, oryzalin, oxadiargyl, oxadiazon, oxasulfuron, oxaziclomefone, oxyfluorfen, paraquat dichloride, pebulate, pelargonic acid, pendimethalin, pentachlorophenol, pentanochlor, pentoxazone, petroleum oils, phenmedipham, picloram, picolinafen, piperophos, pretilachlor, primisulfuron-methyl, prodiamine, prometon, prometryn, propachlor, propanil, propaquizafop, propazine, propham, propisochlor, propyzamide, prosulfocarb, prosulfuron, pyraflufen-ethyl, pyrazosulfuron-ethyl, pyribenzoxim, pyributicarb, pyriminobac-methyl, pyrithiobac-sodium, quinclorac, quinmerac, quinoclamine, quizalofop, quizalofop-P, rimsulfuron, sethoxydim, siduron, simazine, simetryn, sodium chlorate, sulfentrazone, sulfometuron-methyl, sulfosulfuron, sulfuric acid, tar oils, 2,3,6-TBA, TCA-sodium, tebutam, tebuthiuron, tepraloxydim, terbacil, terbumeton, terbuthylazine, terbutryn, thenylchlor, thiazopyr, thifensulfuron-methyl, thiobencarb, tiocarbazil, tralkoxydim, tri-allate, triasulfuron, triaziflam, tribenuron-methyl, triclopyr, trietazine, trifluralin, triflusulfuron-methyl, and vernolate.

In a preferred embodiment, said one or more additional insecticides are selected from the group comprising 5-(2-chloropyrid-5-ylmethyl)-3-methyl-4-nitroiminoperhydro-1, 3,5-oxadiazine, 5-(2-chlorothiazol-5-ylmethyl)-3-methyl-4-nitroiminoperhydro-1,3,5-oxadiazine, 3-methyl-4-nitroimino-5-(1-oxido-3-pyridinomethyl) perhydro-1,3,5-oxadiazine, 5-(2-chloro-1-oxido-5-pyridiniomethyl)-3-methyl-4-nitroiminoperhydro-1,3,5-oxidiazine, 3-methyl-5-(2-methylpyrid-5-ylmethyl)-4-nitroiminoperhydro-1,3,5-oxadiazine, thiamethoxam (CAS RN 153719-23-4), acetamiprid ((E)-N-[(6-chloro-3-pyridinyl)methyl]-N'-cyano-N-methyleneimidamide, CAS RN 135410-20-7), imidacloprid (1-[(6-chloro-3-pyridinyl)methyl]-N-nitro-2-imidazolidinimime, CAS RN 138261-41-3), nitenpyram (N-[(6-chloro-3-pyridinyl)methyl]-N-ethyl-N'-methyl-2-nitro- 1,1-ethenediamine, CAS RN 120738-89-8), clothianidin (TI-435; N-[(2-chloro-5-thiazoyl)methyl]-N'-methyl-N''-nitro, [C(E)]-(9Cl)-guanidine, CAS RN 210880-92-5), dinotefuran (N-methyl-N'-nitro-N''-[(tetrahydro-3-furanyl)methyl)]guanidine; CAS RN 165252-70-0), acephate (CAS RN 30560-19-1), chlorpyrifos (CAS RN 2921-88-2), chlorpyrifos-methyl (CAS RN 5598-13-0), diazinon (CAS RN 333-41-5), fenamiphos (CAS RN 22224-92-6), malathion (CAS RN 121-75-5), aldicarb (CAS RN 116-06-3), carbaryl (CAS RN 63-25-2), carbofuran (CAS RN 1563-66-2), oxamyl (CAS RN 23135-22-0) and thiodicarb (CAS RN 59669-26-0).

In a preferred embodiment, said one or more additional fungicides are selected from the group comprising respiration inhibitors selected from the group comprising azoxystrobin, dimoxystrobin, enestroburin, fluoxastro-bin, kresoxim-methyl, meto-minostrobin, orysastrobin, picoxystrobin, pyraclostrobin, pyrametostrobin, pyraoxystrobin, pyribencarb, trifloxystrobin, methyl (2-chloro-5 [1-(3-methylbenzyl-oxy-imino)-ethyl]benzyl)-carba-mate, 2 (2-(3-(2, 6-di-chlorophenyl)-1-methyl-allylidene-aminooxy-methyl)-phenyl)-2-methoxyimino-N methyl-acetamide, famoxadone, fenamidone, benodanil, bixafen, boscalid, carboxin, fen-furam, fenhexamid, fluopyram, flutolanil, furametpyr, isopyrazam, isotianil, mepronil, oxycarboxin, penflufen, penthiopyrad, sedaxane, tecloftalam, thifluz-amide, tiadinil, 2-amino-4 methyl-thiazole-5-carbox-anilide, N-(3', 4',5' tri-fluoro-bi-phenyl-2 yl)-3-difluoro-methyl-1-methyl-1H-pyrazole-4 carboxamide, N-(4'-tri-fluoro-methyl-thiobiphenyl-2-yl)-3 difluoromethyl-1-methyl-1H pyrazole-4-carbox-amide, N-(2-(1,3,3-trimethyl-butyl)-phenyl)-1,3-dimethyl-5 fluoro-1H-pyrazole-4 carbox-amide, cyazofamid, amisulbrom, diflumetorim, binapacryl, dinobuton, dinocap, fluazinam, nitrthal-isopropyl, tecnazen, ferimzone, fentin salts, ametoctradin and silthiofam; sterol biosynthesis inhibitors (SBI fungicides) selected from the group comprising azaconazole, bitertanol, bromuconazole, cyproconazole, difenoconazole, diniconazole, diniconazole-M, epoxiconazole, fenbuconazole, fluquinconazole, flusilazole, flutriafol, hexaconazole, imibenconazole, ipconazole, metconazole, myclobutanil, paclobutrazole, penconazole, propiconazole, prothio-conazole, simeconazole, tebuconazole, tetraconazole, triadimefon, triadimenol, triticonazole, uniconazole, imazalil, pefurazoate, oxpoconazole, prochloraz, triflumizole, fenarimol, nuarimol, pyrifenox, triforine, aldimorph, dodemorph, dodemorph-acetate, fenpropimorph, tridemorph, fenpropidin, piperalin, spiroxamine, fenhexamid, benalaxyl, benalaxyl-M, kiralaxyl, metalaxyl, metalaxyl-M (mefenoxam), ofurace, oxadixyl, hymexazole, octhilinone, oxolinic acid, bupirimate, benomyl, carbendazim, fuberidazole, thiabendazole, thiophanate-methyl, 5-chloro-7 (4-methyl-piperidin-1-yl)-6-(2,4,6-trifluorophenyl)-[1,2,4]tri-azolo-[1,5a]pyrimidine, diethofencarb, ethaboxam, pencycuron, fluopicolide, zoxamide, metrafenone, cyprodinil, mepanipyrim, nitrapyrin, pyrimethanil, blasticidin-S, kasugamycin, kasugamycin hydrochloride-hydrate, mildiomycin, streptomycin, oxytetracyclin, polyoxine, validamycin A, fluoroimid, iprodione, procymidone, vinclozolin, fenpiclonil, fludioxonil, quinoxyfen, edifenphos, iprobenfos, pyrazophos, isoprothiolane, dicloran, quintozene, tecnazene, tolclofos-methyl, biphenyl, chloroneb, etridiazole, dimethomorph, flumorph, mandiproamid, pyrimorph, benthiavalicarb, iprovalicarb, pyribencarb, valifenalate, N-(1-(1-(4-cyano-phenyl)-ethanesulfonyl)-but-2-yl) carbamic acid-(4-fluorophenyl) ester, propamocarb, propamo-carb-hydrochlorid, Bordeaux mixture, copper acetate, copper hydroxide, copper oxychloride, basic copper sulfate, sulfur, ferbam, mancozeb, maneb, metam, methasulphocarb, metiram, propineb, thiram, zineb, ziram, anilazine, chlorothalonil, captafol, captan, folpet, dichlofluanid, dichlorophen, flusulfamide, hexachlorobenzene, pentachlorphenole and its salts, phthalide, tolylfluanid, N-(4-chloro-2-nitrophenyl)-N-ethyl-4-methyl-benzenesulfonamide, guanidine, dodine, dodine free base, guazatine, guazatine-acetate, iminoctadine, iminoctadine-triacetate, iminoctadine-tris (albesilate), dithianon, validamycin, polyoxin B, pyroquilon, tricyclazole, carpropamide, dicyclomet, fenoxanil, acibenzolar-S-methyl, probenazole, isotianil, tiadinil, prohexadione-calcium, fosetyl, fosetyl-aluminum, phosphorous acid and its salts, bronopol, chinomethionat, cyflufenamid, cymoxanil, dazomet, debacarb, diclomezine, difenzoquat, difenzoquat-methylsulfate, diphenylamin, flumetover, flusulfamide, flutianil, methasulfocarb, oxin-copper, proquinazid, tebufloquin, tecloftalam, triazoxide, 2-butoxy-6-iodo-3-propylchromen-4-one, N-(cyclo-propylmethoxyimino-(6-difluoro-methoxy-2,3-difluoro-phenyl)-methyl)-2-phenyl acetamide, N'-(4-(4-chloro-3-trifluoromethyl-phenoxy)-2,5-dimethyl-phenyl)-N-ethyl-N methyl formamidine, N'(4-(4-fluoro-3-trifluoromethyl-phenoxy)-2,5-dimethyl-phenyl)-N-ethyl-N-methyl formamidine, N'-(2-methyl-5-trifluoromethyl-4-(3-trimethyl-silanyl-prop-oxy)-phenyl)-N-ethyl-N-methyl formamidine, N'-(5-difluoromethyl-2 methyl-4-(3-tri-methylsilanyl-propoxy)-phenyl)-N-ethyl-N-methyl formamidine, 2-{1-[2-(5-methyl-3-trifluoromethyl-pyrazole-1-yl)-acetyl]-piperidin-4-yl}-thiazole-4-carboxylic acid methyl-(1,2,3,4-tetrahydro-naphthalen-1-yl)-amide, 2-{1-[2-(5-meth-yl-3-trifluoromethyl-pyrazole-1-yl)-acetyl]-piperidin-4-yl}-thiazole-4-carboxylic acid methyl-(R)-1,2,3,4-tetrahydro-naphthalen-1-yl-amide, methoxy-acetic acid 6-tert-butyl-8-fluoro-2,3-dimethyl-quinolin-4-yl ester, N-Methyl-2-{1-[(5-methyl-3-trifluoromethyl-1H-pyr-azol-1-yl)-acetyl]-piperi-din-4-yl}-N-[(1R)-1,2,3,4-tetrahydro-naphthalen-1-yl]-4-thi-azolecarboxamide, 3-[5-(4-chloro-phenyl)-2,3-dimethyl-isoxazolidin-3 yl]-pyridine, 3-[5-(4-methyl-phenyl)-2,3-dimethyl-isoxazolidin-3-yl]-pyridine, 5-amino-2-isopropyl-3-oxo-4-ortho-tolyl-2,3-dihydro-pyrazole-1 carbothioic acid S-allyl ester, N-(6-methoxy-pyridin-3-yl) cyclopropanecarboxylic acid amide, 5-chloro-1 (4,6-dimethoxy-pyrimidin-2-yl)-2-methyl-1H-benzoimidazole, 2-(4-chloro-phenyl)-N-[4-(3,4-dimeth-oxy-phenyl)-isoxazol-5-yl]-2-prop-2-ynyloxy-acetamide, abscisic acid, amidochlor, ancymidol, 6-benzylaminopurine, brassinolide, butralin, chlormequat (chlormequat chloride), choline chloride, cyclanilide, daminozide, dike-gulac, dimethipin, 2,6-dimethylpuridine, ethephon, flumetralin, flurprimidol, fluthiacet, forchlorfenuron, gibberellic acid, inabenfide, indole-3-acetic acid, maleic hydrazide, mefluidide, mepiquat (mepiquat chloride), naphthaleneacetic acid, N 6 benzyladenine, paclobutrazol, prohexadione (prohexadione-calcium), prohydrojasmon, thidiazuron, triapenthenol, tributyl phosphorotrithioate, 2,3,5 tri iodobenzoic acid, trinexapacethyl and uniconazole, and antifungal biocontrol agents.

Whilst compositions comprising pyridate and at least one 4-HPPD inhibitor according to the first aspect of the invention and also one or more additional pesticides such as herbicides, insecticides, fungicides or other active pesticide ingredients are disclosed above, the skilled man will appreciate that the invention extends to further multiple combinations comprising the above mixtures. For the avoidance of doubt, even if not explicitly stated here, mixing partners may also be in the form of any suitable agrochemically acceptable ester or salt, as mentioned e.g. in The Pesticide Manual, Thirteenth Edition, British Crop Protection Council, 2003.

Suitable agricultural adjuvants and carriers that are useful in formulating the compositions of the invention in the formulation types described above are well known to those skilled in the art. Suitable examples of the different classes are found in the non-limiting lists below.

Liquid carriers that can be employed include water and one or more solvents selected from the group comprising toluene, xylene, petroleum naphta, p-diethyl benzene, isopropyl benzene, m-xylene, o-xylene, p-xylene; cyclohexane, hexadecane, isooctane, n-hexane; paraffin oil, mineral oil, crop oil; chlorobenzene, 1,2-dichloropropane, 1.1.-trichloroethane, methylene chloride, trichloroethylene, perchloroethylene; alpha-pinene, d-limonene; lactic acid and ester derivatives, such as methyl lactate, ethyl lactate, butyl lactate, 2-ethylhexyl lactate; octadecanoic acid, oleic acid, propionic acid, xylene sulphonic acid and their ester forms; cyclohexanol, diacetone alcohol, diethylene glycol, dipropylene glycol, 2-ethyl hexanol, ethylene glycol, phenol, polyethylene glycol (PEG400), propylene glycol, triethylene glycol, methanol, ethanol, isopropanol, and higher molecular weight alcohols such as amyl alcohol, tetrahydrofurfuryl alcohol, hexanol, octanol, ethylene glycol, propylene glycol, glycerol, benzyl alcohol; acetone, methyl ethyl ketone, cyclohexanone, acetophenone, 2-butanone, 2-heptanone, gamma-butyrolactone, glycerol, isophorone, mesityl oxide, methyl isoamyl ketone, methyl isobutyl ketone; diethylene glycol butyl ether, diethylene glycol ethyl ether, 1,4-dioxane, dipropylene glycol methyl ether, propylene glycol ethers (diproxitol), ethylene glycol butyl ether, ethylene glycol methyl ether, methoxy propanol, propylene glycol monomethyl ether; alkyl acetates such as ethyl acetate, propyl acetate, n-butyl acetate, amyl acetate, isoamyl acetate, isobornyl acetate, octyl amine acetate, glycerol monoacetate, glycerol diacetate, glycerol triacetate, 2-ethyl hexyl stearate, methyl oleate, n-butyl oleate, isopropyl myristate, methyl laurate, methyl octanoate, diethylene glycol abietate, dipropylene glycol dibenzoate, propylene glycol dioleate, di-octyl succinate, di-butyl adipate, di-octyl phthalate, triethyl phosphate, dibasic esters (dimethyl glutarate+dimethyl succinate+dimethyl adipate), butyl benzoate; ethylene carbonate, propylene carbonate and butylene carbonate; diethanolamine, laurylamine, n-octylamine, oleylamine; N,N-dimethyl alkylamides such as N,N-dimethyl formamide, N,N-dimethylacetamide, N,N-dimethyl octan/decanamide, N,N-dimethyl decanamide, N,N-dimethyl dodecanamide, dimethyl lactamide; methyl 5-(dimethylamino)-4-methyl-5-oxopentanote; alkyl pyrrolidinones, such as N-methyl-2-pyrrolidinone, N-ethyl-2-pyrrolidinone; dimethyl sulfoxide; acetonitrile; acetic anhydride; and the like, soybean oil, rapeseed oil, sunflower seed oil, corn oil, cotton seed oil, linseed oil, safflower oil, olive oil, peanut oil, castor oil, palm oil, coconut oil, sesame oil, tung oil and the like; esters of the above vegetable oils, and the like. Water is generally the carrier of choice for the dilution of concentrates.

Suitable solid carriers include talc, titanium dioxide, pyrophyllite clay, silica, kaolin clay, attapulgite clay, kieselguhr, chalk, diatomaceous earth, lime, montmorillonite clay, lime, calcium carbonate, bentonite clay, fuller's earth, cottonseed hulls, wheat flour, soybean flour, pumice, wood floor, walnut shell flour, lignin, cellulose and the like.

A broad range of surface-active agents are advantageously employed in both said liquid and solid compositions, especially those designed to be diluted with carrier before application. Surface-active agents, also known as surfactants, are compounds that lower the surface tension (or interfacial tension) between two liquids or between a liquid and a solid. Surface-active agents can be anionic, cationic, non-ionic or polymeric in character and may act as detergents, wetting agents, emulsifiers, foaming agents, and dispersants. Many organic compounds exhibit some surface-active properties; however specifically for the purposes of the invention nonionic surface-active agents can be used. Prominent among these are the fatty alcohols, such as cetyl alcohol, stearyl alcohol, and cetostearyl alcohol (consisting predominantly of cetyl and stearyl alcohols), and oleyl alcohol; but also polyethylene glycol alkyl ethers such as octaethylene glycol monododecyl ether and pentaethylene glycol monododecyl ether; polypropylene glycol alkyl ethers; polyethylene glycol-polypropylene glycol alkyl ethers; glucoside alkyl ethers such as decyl glucoside, lauryl glucoside or octyl glucoside; polyethylene glycol octylphenyl ethers; polyethylene glycol nonylphenyl ethers; polyethylene glycol tributylphenyl ethers; polyethylene glycol tristyrylphenyl ethers; polyethylene glycol-polypropylene glycol tristyrylphenyl ethers; glycerol alkyl esters such as glyceryl laurate; polyoxyethylene glycol sorbitan alkyl esters, such as polysorbates; sorbitan alkyl esters, such as spans; cocamide MEA or DEA; dodecyldimethylamine oxide; block copolymers of polyethylene glycol and polypropylene glycol, such as poloxamers; polyethoxylated tallow amine (POEA); vegetable oil ethoxylates, such as castor oil ethoxylates, rapeseed oil ethoxylates, soybean oil ethoxylates; and the like, salts of alkyl sulfates, such as diethanolammonium lauryl sulfate; alkylarylsulfonate salts, such as calcium dodecylbenzenesulfonate; soaps, such as sodium stearate; alkylnaphtalene-sulfonate salts, such as sodium dibutylnaphtalenesulfonate; dialkyl esters of sulfosuccinate salts, such as sodium di-(2-ethyl hexyl) sulfosuccinate; salts of mono and dialkyl phosphate esters; quaternary amines, such as lauryl trimethylammonium chloride and the like.

The compositions can be formulated with liquid and solid fertilizers, such as particulate fertilizers like ammonium nitrate, urea and the like.

In a preferred embodiment, the herbicide composition according to the first aspect of the present invention additionally comprises one or more compounds that function to improve crop plant compatibility, selected from the group comprising 4-dichloroacetyl-1-oxa-4-aza-spiro[4.5]-decane (AD-67, MON-4660), 1-dichloro-acetyl-hexahydro-3,3,8a-trimethylpyrrolo[1,2-a]-pyrimidin-6 (2H)-one (dicyclonon, BAS-145138), 4-dichloroacetyl-3,4-dihydro-3-methyl-2H-1,4-benzoxazine (benoxacor), 1-methyl-hexyl 5-chloro-quinolin-8-oxy-acetate (cloquintocet-mexyl-cf. also related compounds in EP-A-86750, EP-A-94349, EP-A-191736, EP-A-492366), 3-(2-chloro-benzyl)-1-(1-methyl-1-phenyl-ethyl)-urea (cumyluron), a-(cyano methoximino)-phenylacetonitrile (cyometrinil), 2,4-dichloro-phenoxyacetic acid (2,4-D), 4-(2,4-dichloro-phenoxy)-butyric acid (2,4-DB), 1-(1-methyl-1-phenyl-ethyl)-3-(4-methyl-phenyl)-urea (daimuron, dymron), 3,6-dichloro-2-methoxy-benzoic acid (dicamba), S-1-methyl-1-phenyl-ethyl piperidine-1-thiocarboxylate (dimepiperate), 2,2-dichloro-N-(2-oxo-2-(2-propenylamino)-ethyl)-N-(2-propenyl)-acetamide (DKA-24), 2,2-dichloro-N,N-di-2-propenyl-acetamide (dichlormid), 4,6-dichloro-2-phenyl-pyrimidine (fenclorim), ethyl 1-(2,4-dichloro-phenyl)-5-trichloromethyl-1H-1,2,4-triazole-3-carboxylate (fenchlorazole-ethyl-cf. also related compounds in EP-A-174562 and EP-A-346620), phenylmethyl 2-chloro-4-trifluoromethyl-thiazole-5-carboxylate (flurazole), 4-chloro-N-(1,3-dioxolan-2-yl-methoxy)-a-trifluoro acetophenone oxime (fluxofenim), 3-dichloroacetyl-5-(2-furanyl)-2,2-dimethyl-oxazolidine (furilazole, MON-13900), ethyl 4,5-dihydro-5,5-diphenyl-3-isoxazolecarboxylate (isoxadifen-ethyl-cf. also related compounds in WO-A-95/07897), 1-(ethoxycarbonyl)-ethyl 3,6-dichloro-2-methoxybenzoate (lactidichlor), (4-chloro-o-tolyloxy)-acetic acid (MCPA), 2-(4-chloro-o-tolyloxy)-propionic acid (mecoprop), diethyl 1-(2,4-dichloro-phenyl)-4,5-dihydro-5-methyl-1H-pyrazole-3,5-dicarboxylate (mefenpyr-diethyl-cf. also related compounds in WO-A-91/07874), 2-dichloromethyl-2-methyl-1,3-dioxolane (MG-191), 2-propenyl-1-oxa-4-azaspiro[4.5]decane 4-carbodithioate (MG-838), 1,8-naphthalic anhydride, a-(1,3-dioxolan-2-yl-methoximino)-phenylacetonitrile (oxabetrinil), 2,2-dichloro-N-(1,3-dioxolan-2-yl-methyl)-N-(2-propenyl)-acetamide (PPG-1292), 3-dichloroacetyl-2,2-dimethyl-oxazolidine (R-28725), 3-dichloroacetyl-2,2,5-trimethyl-oxazolidine (R-29148), 4-(4-chloro-o-tolyl)-butyric acid, 4-(4-chloro-phenoxy)-butyric acid, diphenylmethoxyacetic acid, methyl diphenylmethoxyacetate, ethyl diphenyl-methoxyacetate, methyl 1-(2-chloro-phenyl)-5-phenyl-1H-pyrazole-3-carboxylate, ethyl 1-(2,4-dichloro-phenyl)-5-methyl-1H-pyrazole-3-carboxylate, ethyl 1-(2,4-dichloro-phenyl)-5-isopropyl-1H-pyrazole-3-carboxylate, ethyl 1-(2,4-dichloro-phenyl)-5-(1,1-dimethyl-ethyl)-1H-pyrazole-3-carboxylate, ethyl 1-(2,4-dichloro-phenyl)-5-phenyl-1H-pyrazole-3-carboxylate (cf also related compounds in EP-A-269806 and EP-A-333131), ethyl 5-(2,4-dichloro-benzyl)-2-isoxazoline-3-carboxylate, ethyl 5-phenyl-2-isoxazoline-3-carboxylate, ethyl 5-(4-fluoro-phenyl)-5-phenyl-2-isoxazoline-3-carboxylate (cf. also related compounds in WO-A-91/08202), 1,3-dimethyl-but-1-yl 5-chloro-quinolin-8-oxy-acetate, 4-allyloxy-butyl 5-chloro-quinolin-8-oxy-acetate, 1-allyloxy-prop-2-yl 5-chloro-quinolin-8-oxy-acetate, methyl 5-chloro-quinoxalin-8-oxy-acetate, ethyl 5-chloro-quinolin-8-oxy-acetate, allyl 5-chloro-quinoxalin-8-oxy-acetate, 2-oxo-prop-1-yl 5-chloro-quinolin-8-oxy-acetate, diethyl 5-chloro-quinolin-8-oxy-malonate, diallyl 5-chloro-quinoxalin-8-oxy-malonate, diethyl 5-chloro-quinolin-8-oxy-malonate (cf. also related compounds in EP-A-582198), 4-carboxy-chroman-4-yl-acetic acid (AC-304415, cf. EP-A-613618), 4-chloro-phenoxy-acetic acid, 3,3'-dimethyl-4-methoxy-benzophenone, 1-bromo-4-chloromethylsulphonyl-benzene, 1-[4-(N-2-methoxybenzoylsulphamoyl)-phenyl]-3-methyl-urea (alias N-(2-methoxy-benzoyl)-4-[(methylamino-carbonyl)-amino]-benzenesulphonamide), 1-[4-(N-2-methoxybenzoylsulphamoyl)-phenyl]-3,3-dimethyl-urea, 1-[4-(N-4,5-dimethylbenzoylsulphamoyl)-phenyl]-3-methyl-urea, 1-[4-(N-naphthylsulphamoyl)-phenyl]-3,3-dimethyl-urea, and N-(2-methoxy-5-methyl-benzoyl)-4-(cyclopropylaminocarbonyl)-benzenesulphonamide.

In a most preferred embodiment, the herbicide composition according to the first aspect of the present invention is provided as a tank mixture, wherein pyridate and at least one 4-HPPD inhibitor are to be combined prior to use, in which said pyridate is present in a concentration of 0.3 to 30 g/L water, more preferably of 0.4 to 25 g/L water and even more preferably of 0.5 to 20 g/L water, and in which said at least one 4-HPPD inhibitor is present in a concentration of 0.01 to 10 g/L water, more preferably of 0.02 to 6 g/L water, even more preferably of 0.05 to 3.5 g/L water, and even more preferably of 0.08 to 3 g/L water. By example but not limited to, said concentration ranges of pyridate are prepared by mixing an emulsifiable concentrate or a wettable powder of pyridate with water. Preferably, said emulsifiable concentrate comprises 5 to 950 g pyridate/L, more preferably 10 to 900 g pyridate/L, even more preferably 50 to 850 g pyridate/L, even more preferably 100 to 800 g pyridate/L, even more preferably 250 to 750 g pyridate/L, even more preferably 400 to 700 g pyridate/L and most preferably 550 to 650 g pyridate/L. Preferably, said wettable powder comprises 100 to 800 g pyridate/kg, more preferably 150 to 750 g pyridate/kg, even more preferably 200 to 700 g pyridate/kg, even more preferably 250 to 650 g pyridate/kg, even more preferably 300 to 600 g pyridate/kg, even more preferably 350 to 550 g pyridate/kg and most preferably 400 to 500 g pyridate/kg. By example but not limited to, said concentration ranges of at least one 4-HPPD inhibitor are prepared by mixing by mixing a suspension concentrate (SC), an oil dispersion (OD) or a water dispersible granule (WG) of at least one 4-HPPD inhibitor with water. Preferably, said suspension concentrate comprises 10 to 900 g of at least one 4-HPPD inhibitor/L, more preferably 30 to 600 g of at least one 4-HPPD inhibitor/L, more preferably 40 to 560 g of at least one 4-HPPD inhibitor/L, even more preferably 50 to 520 g of at least one 4-HPPD inhibitor/L, even more preferably 60 to 480 g of at least one 4-HPPD inhibitor/L, even more preferably 70 to 440 g of at least one 4-HPPD inhibitor/L, even more preferably 80 to 400 g of at least one 4-HPPD inhibitor/L and most preferably 90 to 360 g of at least one 4-HPPD inhibitor/L.

A second aspect of the present invention provides a kit comprising one or more spatially separated components to be used as a herbicide composition, comprising as component (A) an herbicidally active amount of pyridate and as component (B) at least one 4-HPPD inhibitor, which components are for simultaneous, separate or sequential use.

In a preferred embodiment, the present invention provides a kit according to the second aspect of the invention, comprising one or more spatially separated components according to the herbicide composition according to the first aspect of the present invention.

A kit according to embodiments of the second aspect of the present invention allows for controlling unwanted vegetation in a flexible and modular manner. In particular, uses of said kit include simultaneous, separate or sequential use of the herbicide components.

In embodiments, a use of kit according to the second aspect of the invention involves separate application of the components of the kit, or the use of a mixture of one or more components of the kit, for example as tank mixtures.

In one embodiment, a use of the kit includes sequential use or sequential use of different herbicide components of the kit. This makes it possible to apply several components for a different period, possibly several times. As a result, for example, one or more herbicide components can be applied before or early after emergence of unwanted vegetation while one or more other components of the kit can only be applied later after emergence of unwanted vegetation. Nevertheless, a user can still provide a combination formulation, such as, for example, a ready-to-use formulation, in order to jointly apply the herbicide components, either in a prescribed, desired or adapted weight ratio.

The use of a kit according to the second aspect of the present invention allows for a high degree of modularity. This has the advantage that a user can adjust the applied amount, the dosage and/or the composition of one or more herbicide components and/or a combination formulation thereof as desired, for example depending on the relative amount of specific undesirable vegetation.

A third aspect of the present invention provides a use of a herbicide composition according to the first aspect of the present invention for controlling one or more types of unwanted vegetation by applying the herbicide composition to the unwanted vegetation and/or a habitat thereof.

The herbicide composition according to the first aspect of the present invention has very good herbicidal properties and can be used for controlling unwanted vegetation.

The herbicide composition according to the first aspect of the present invention can be used, for example, in connection with one or more species of the following unwanted vegetation: one or more species from the Lamiaceae such as field woundwort (Stachys *arvensis*), one or more species from the Papaveraceae family such as common poppy (*Papaver rhoeas*) and common fumitory (Fumaria *officinalis* L.), one or more species from the Cyperaceae family such as green kyllinga (Kyllinga *brevifolia* Rottb. var. leiolepis), sedge (*Cyperus* spp.), for which the sedge may, for example, be purple nutsedge (*Cyperus rotundus* L.), smallflower umbrella sedge (*Cyperus difformis* L.), yellow nutsedge (*Cyperus esculentus* L.) and amur *cyperus* (*Cyperus* microiria Steud.), one or more species from the Asteraceae family such as creeping thistle (*Cirsium arvense*), annual ragweed (*Ambrosia artemisiifolia*), Moroccan chamomile (Cladanthus *mixtus*), prickly sow-thistle (*Sonchus asper* (L.) Hill), gallant soldiers (*Galinsoga parviflora*), bachelor's button (*Cyanus segetum*), hairy galinsoga (*Galinsoga quadriradiata*), chamomile (*Matricaria chamomilla*), scentless false mayweed (Tripleurospermum inodorum), common sowthistle (*Sonchus oleraceus*) and spiny cocklebur (*Xanthium spinosum*), one or more species from the Gramineae family such as rice millet (Oloptum *miliaceum*), common millet (*Panicum miliaceum* L.), barnyardgrass (*Echinochloa crus-galli* L., Bengal grass (*Setaria italica*), yellow foxtail (*Setaria pumila*), *Echinochloa* oryzicola Vasing.), Japanese millet (*Echinochloa utilis* Ohwi et Yabuno), crabgrass (*Digitaria* spp.), of which the crabgrass may, for example, be summergrass (*Digitaria ciliaris* (Retz.) Koel), large crabgrass (*Digitaria sanguinalis* L.), violet crabgrass (*Digitaria violascens* Link) or *Digitaria horizontalis* Willd., green foxtail (*Setaria viridis* L.), hooked bristlegrass (*Setaria verticillata*), giant foxtail (*Setaria faberi* Herrm.), goosegrass (*Eleusine indica* L.), johnsongrass (*Sorghum halepense* (L.) Pers.), bermudagrass (*Cynodon dactylon* (L.) Pers.), wild oat (*Avena fatua* L.), annual bluegrass (*Poa annua* L.), quackgrass (Elytrigia *repens* L.), blackgrass (*Alopecurus myosuroides*), panic grass (*Panicum* spp.), of which the panic grass may, for example, be guinea grass (*Panicum maximum* Jacq.), or fall *panicum* (*Panicum dichotomiflorum* (L.) Michx.), and signal grass (*Brachiaria* spp.), one or more species from the Primulaceae family such as scarlet pimpernel (Anagallis *arvensis*) one or more species from the Scrophulariaceae family such as persian speedwell (*Veronica persica* Poir.), corn speedwell (*Veronica arvensis* L.), compositae such as beggar ticks (*Bidens* spp.), of which the beggar ticks may, for example, be hairy beggar ticks (*Bidens pilosa* L.), devils beggar ticks (*Bidens frondosa* L.), *Bidens biternata* (Lour.) Merr. et Sherff, or beggarticks (*Bidens subalternans* DC.), hairy fleabane (*Conyza bonariensis* (L.) Cronq.), horseweed (Erigeron *canadensis* L.), dandelion (*Taraxacum officinale* Weber), and common cocklebur (*Xanthium strumarium* L.), one or more species from the Caryophyllaceae family such as sticky chickweed (*Cerastium glomeratum* Thuill.), corn spurrey (Spergula *arvensis* L.) and common chickweed (*Stellaria media* L.), one or more species from the Euphorbiaceae family such as annual mercury (*Mercurialis annua*), garden spurge (*Euphorbia hirta* L.), threeseeded copperleaf (Acalypha *australis* L.) Virginia copperleaf (Acalypha *virginica* L.) and fireplant (*Euphorbia heterophylla* L.), one or more species from the Plantaginaceae family such as Asiatic plantain (*Plantago asiatica* L.), ivyleaf speedwell (*Veronica hederifolia* L.), broadleaf plantain (*Plantago major* L.) and sharpleaf cancerwort (Kickxia elatine), Oxalidaceae such as creeping woodsorrel (Oxalis *corniculata* L.), Apiaceae such as lawn pennywort (Hydrocotyle sibthorpioides Lam.), one or more species from the Urticaceae family such as burning nettle (*Urtica urens* L.), one or more species from the Violaceae family such as violet (Viola *mandshurica* W. Becker) and field pansy (Viola *arvensis*); Iridaceae such as blue-eyed-grass (Sisyrinchium rosulatum Bicknell), one or more species from the Geraniaceae family such as small-flowered cranesbill (Geranium pusillum L.), carolina geranium (Geranium *carolinianum* L.), cutleaf geranium (Geranium dissectum L.), Labiatae such as purple deadnettle (*Lamium purpureum* L.) and henbit (*Lamium amplexicaule* L.), one or more species from the Malvaceae family such as Venice mallow (*Hibiscus trionum* L.), velvetleaf (*Abutilon theophrasti* MEDIC.), *Hibiscus* ternatus and prickly *sida* (*Sida spinosa* L.), one or more species from the Brassicaceae family such as rapeseed (*Brassica napus*), winter oilseed rape (*Brassica napus* (winter)), *Brassica rapa* Canola cultivars, mouse-ear cress (*Arabidopsis thaliana*), shepherd's purse (*Capsella bursa-pastoris*), charlock mustard (*Sinapis arvensis*) and field pennycress (*Thlaspi arvense*), one or more species from the Convolvulaceae family such as field bindweed (*Convolvulus arvensis* L.), one or more species from the Boraginaceae family such as field forget-me-not (*Myosotis arvensis*), one or more species from the Chenopodiaceae family such as common lambsquarters (*Chenopodium album* L.), one or more species from the Portulacaceae such as common purslane (*Portulaca oleracea* L.), one or more species from the Amaranthaceae such as spear saltbush (*Atriplex patula*), burningbush (Bassia *scoparia*), fig-leaved goosefoot (*Chenopodium* ficifolium), maple-leaf goosefoot (Chenopodiastrum *hybridum*), pigweed (*Amaranthus* spp.), of which the pigweed may, for example, be prostrate pigweed (*Amaranthus blitoides* S. Wats.), livid amaranth (*Amaranthus lividus* L.), purple amaranth (*Amaranthus blitum* L.), smooth pigweed (*Amaranthus hybridus* L.), *Amaranthus* patulus Bertol., powell amaranth (*Amaranthus powellii* S. Wats.), slender amaranth (*Amaranthus viridis* L.), palmer amaranth (*Amaranthus palmeri* S. Wats.), redroot pigweed (*Amaranthus retroflexus* L.), tall waterhemp (*Amaranthus tuberculatus* (Moq.) Sauer.), common waterhemp (*Amaranthus* tamariscinus Nutt.), thorny amaranth (*Amaranthus spinosus* L.), ataco (*Amaranthus* quitensis Kunth.) and *Amaranthus rudis* Sauer, one or more species from the Cannabaceae family such as common hemp (*Cannabis sativa*), one or more species from the Solanaceae family such as hairy nightshade (*Solanum villosum* Miller), black nightshade (*Solanum nigrum* L.), green nightshade (*Solanum* physalifolium var. nitidibaccatum) and jimsonweed (*Datura stramonium*), one or more species from the Polygonaceae family such as common knotgrass (*Polygonum aviculare* L.), black-bindweed (*Fallopia convolvulus*), spotted knotweed (*Persicaria* maculate), lady's thumb (*Persicaria maculosa*), *Polygonum* persicarioides, bitter dock (*Rumex obtusifolius*), spotted knotweed (*Polygonum* lapathifolium L.), green smartweed (*Polygonum* scabrum MOENCH), Oriental lady's thumb (*Persicaria* longiseta) and Nepalese Smartweed (*Persicaria nepalensis* (Meisn.) H. Gross), one or more species from the Cruciferae family such as flexuous bittercress (*Cardamine flexuosa* WITH.), one or more species from the Cucurbitaceae family such as burcucumber (Sicyos *angulatus* L.), one or more species from the Molluginacea family such as carpetweed (*Mollugo verticillata* L.) and one or more species from the Rubiaceae family such as false cleavers (*Galium spurium* var. echinospermon (Wallr.) Hayek) and stickywilly (*Galium aparine* L.).

Preferably, the herbicide composition according to the first aspect of the present invention is applied post-emergence to unwanted vegetation. If the herbicide composition is applied post-emergence to the green parts of the unwanted vegetation, growth likewise stops drastically a very short time after the treatment, and the unwanted vegetation remains at the growth stage of the point of time of application, or they die completely after a certain time, so that in this manner infestation of unwanted vegetation is eliminated very early and in a sustained manner. The herbicide composition according to the first aspect of the present invention may also be applied pre-emergence, and/or shortly before or around emergence.

In an embodiment, the herbicide composition according to the first aspect of the present invention can be used as total herbicide for controlling unwanted vegetation, for example in particular on non-crop areas like amenity areas such as paths, squares and also under trees and shrubs, rail tracks etc. The herbicide composition according to the first aspect of the present invention is distinguished by an action which has a particularly quick onset and lasts for a long time.

The herbicide composition according to the first aspect of the present invention can be prepared by known processes, for example as ready-mix applications of, for example, a ready-to-use (RTU) formulation, emulsifiable concentrate (EC) formulation, microemulsifiable concentrate, suspension concentrate (SC) formulation, oil dispersion (OD) formulation, soluble liquid (SL) formulation, wettable powder (WP) formulation, water dispersible granule (WG), or water soluble granule (SG) formulation, if appropriate with further active compounds, additives and/or customary formulation auxiliaries, which combinations are then applied in a customary manner diluted with water, or as tank mixes by dilution of components, formulated separately or formulated partially separately, with water. Also possible is the split application of the separately formulated or partially separately formulated individual components. It is also possible to use pyridate or at least one 4-HPPD inhibitor or the herbicide combination in a plurality of portions (sequential application), for example by the post-emergence method or early post-emergence applications followed by medium or late post-emergence applications.

A preferred variant of the invention relates to processes for controlling unwanted vegetation where component (A) and component (B) of the herbicide combination according to the invention are mixed only shortly before application onto the unwanted vegetation and/or their habitat. According to the invention, "shortly before application" means that component (A) and component (B) are mixed preferably less than 6 hours, more preferably less than 3 hours and even more preferably less than 1 hour before application onto the unwanted vegetation and/or their habitat.

Other than that, the pyridate and at least one 4-HPPD inhibitor provided in accordance with the first aspect of the present invention can be converted together or separately into customary formulations, such as solutions, emulsions, suspensions, powders, foams, pastes, granules, aerosols, natural and synthetic materials impregnated with active compound and microencapsulations in polymeric materials. The formulations may comprise the customary auxiliaries and additives.

These formulations are produced in a known manner, for example by mixing the active compounds with extenders, i.e. liquid solvents, pressurized liquefied gases and/or solid carriers, optionally with use of surface-active agents, i.e. emulsifiers and/or dispersants and/or foam formers.

If the extender used is water, it is also possible to use, for example, organic solvents as auxiliary solvents. Suitable liquid solvents are essentially: aromatics such as xylene, toluene or alkylnaphthalenes, chlorinated aromatics or chlorinated aliphatic hydrocarbons such as chlorobenzenes, chloroethylenes or methylene chloride, aliphatic hydrocarbons such as cyclohexane or paraffins, for example mineral oil fractions, mineral and vegetable oils, such as soybean oil, alcohols such as butanol or glycol and the ethers and esters thereof, ketones such as acetone, methyl ethyl ketone, methyl isobutyl ketone or cyclohexanone, strongly polar solvents such as dimethylformamide or dimethyl sulfoxide, and water.

Useful solid carriers include: for example ammonium salts and ground natural minerals, such as kaolins, clays, talc, chalk, quartz, attapulgite, montmorillonite or diatomaceous earth, and ground synthetic minerals, such as finely divided silica and hydrophobic silica, alumina and silicates; useful solid carriers for granules include: for example crushed and fractionated natural rocks, such as calcite, marble, pumice, sepiolite, dolomite and synthetic granules of inorganic and organic flours, and granules of organic material, such as sawdust, coconut shells, corn cobs and tobacco stalks; useful emulsifiers and/or foam formers include: for example non-ionic and anionic emulsifiers, such as polyoxyethylene fatty acid esters, polyoxyethylene fatty alcohol ethers, e.g. alkylaryl polyglycol ethers, alkylsulfonates, alkylsulfates, arylsulfonates and protein hydrolyzates; useful dispersants include: for example lignosulfite waste liquors and methylcellulose.

In the formulations, it is possible to use tackifiers such as carboxymethylcellulose, natural and synthetic polymers in the form of powders, granules or latices, such as gum arabic, polyvinyl alcohol and polyvinyl acetate, or else natural phospholipids such as cephalins and lecithins and synthetic phospholipids. Further additives may be mineral and vegetable oils.

It is possible to use colorants such as inorganic pigments, for example iron oxide, titanium oxide and Prussian blue, and organic colorants such as alizarin colorants, azo colorants and metal phthalocyanine colorants, and trace nutrients such as salts of iron, manganese, boron, copper, cobalt, molybdenum and zinc.

Preferably, the formulations comprise between 0.1 and 99% by weight of active compound, preferably between 0.15 and 95% by weight, and preferably between 0.2 and 90% by weight.

In a preferred embodiment of the use according to the third aspect of the present invention, said herbicide composition is applied onto said one or more types of unwanted vegetation shortly before, around or after emergence of one or more crop types in proximity of said unwanted vegetation, wherein the herbicide composition is reapplied at a specified time interval of 1 day to 50 days, more preferably 2 to 40 days and most preferably 5 to 23 days until harvest of said one or more crop types. Preferably, application of said herbicide composition is only repeated one time. Preferably, maize is selected as a crop.

In a preferred embodiment of the use according to the third aspect of the present invention, said herbicide composition is applied by spraying, sprinkling, showering, spritzing, spreading in droplets, watering, atomizing, spattering, dispersing, diffusing, broadcasting and/or douching.

In a preferred embodiment of the use according to the third aspect of the present invention, said herbicide composition is applied in a target dose rate of 40 to 5000 g, more preferably of 60 to 4000 g, even more preferably of 80 to 3000 g, even more preferably of 100 to 2500 g, even more preferably of 120 to 2000 g, even more preferably of 140 to 1500 g, even more preferably of 160 to 1000 g, yet even more preferably of 180 to 750 g and most preferably of 200 to 600 g of pyridate per hectare of land and of 1 to 1500 g, more preferably of 2 to 1200 g, yet even more preferably of 4 to 900 g, even more preferably of 6 to 600 g, yet even more preferably of 8 to 520 g and most preferably of 10 to 490 g of at least one 4-HPPD inhibitor per hectare of land. Said amounts of pyridate and at least one 4-HPPD inhibitor are to be interpreted as amounts of active substance, or in other words, as amounts of 100% active compound. Within said ranges of target dose rates, the composition comprising pyridate and at least one 4-HPPD inhibitor can be used to control a relatively wide spectrum of unwanted vegetation.

The herbicide composition according to the first aspect of the present invention can be used as such, in the form of its formulations or in the use forms prepared therefrom by further dilution, such as ready-to-use solutions, suspensions, emulsions, powders, pastes and granules. The herbicide composition according to the first aspect of the present invention can be applied in the form of finished formulations. However, the active compounds contained in the herbicide composition can, as individual formulations, also be mixed prior to use, i.e. be applied in the form of tank mixes or a tank mixture.

In a preferred embodiment of the use according to the third aspect of the present invention, said herbicide composition is applied as a tank mixture, wherein pyridate and at least one 4-HPPD inhibitor are combined prior to use.

In a preferred embodiment of the use according to the third aspect of the present invention, said herbicide composition is applied by applying pyridate in a concentration of 0.3 to 30 g/L water, more preferably of 0.4 to 25 g/L water and even more preferably of 0.5 to 20 g/L water at a target dose rate of 30 to 600 L, more preferably 40 to 550 L, even more preferably 45 to 500 L and most preferably 50 to 450 L per hectare of land and by applying at least one 4-HPPD inhibitor in a concentration of 0.01 to 10 g/L water, more preferably of 0.02 to 6 g/L water, even more preferably of 0.05 to 3.5 g/L water, and even more preferably of 0.08 to 3 g/L water at a target dose rate of 30 to 600 L, more preferably of 40 to 550 L, even more preferably of 45 to 500 L, and even more preferably of 50 to 450 L per hectare of land. By example but not limited to, said concentration ranges of pyridate are prepared by mixing an emulsifiable concentrate or a wettable powder of pyridate with water. Preferably, said emulsifiable concentrate comprises 5 to 950 g pyridate/L, more preferably 10 to 900 g pyridate/L, even more preferably 50 to 850 g pyridate/L, even more preferably 100 to 800 g pyridate/L, even more preferably 250 to 750 g pyridate/L, even more preferably 400 to 700 g pyridate/L and most preferably 550 to 650 g pyridate/L. Preferably, said wettable powder comprises 100 to 800 g pyridate/kg, more preferably 150 to 750 g pyridate/kg, even more preferably 200 to 700 g pyridate/kg, even more preferably 250 to 650 g pyridate/kg, even more preferably 300 to 600 g pyridate/kg, even more preferably 350 to 550 g pyridate/kg and most preferably 400 to 500 g pyridate/kg. By example but not limited to, said concentration ranges of at least one 4-HPPD inhibitor are prepared by mixing a suspension concentrate (SC), an oil dispersion (OD) or a water dispersible granule (WG) of at least one 4-HPPD inhibitor with water. Preferably, said suspension concentrate comprises 10 to 900 g of at least one 4-HPPD inhibitor/L, more preferably 30 to 600 g of at least one 4-HPPD inhibitor/L, more preferably 40 to 560 g of at least one 4-HPPD inhibitor/L, even more preferably 50 to 520 g of at least one 4-HPPD inhibitor/L, even more preferably 60 to 480 g of at least one 4-HPPD inhibitor/L, even more preferably 70 to 440 g of at least one 4-HPPD inhibitor/L, even more preferably 80 to 400 g of at least one 4-HPPD inhibitor/L and most preferably 90 to 360 g of at least one 4-HPPD inhibitor/L.

The good herbicidal action of the herbicide composition according to the present invention can be seen from the examples which follow. While the individual active compounds show weaknesses in their herbicidal action, all combinations show a very good action on unwanted vegetation which exceeds a simple sum of actions.

A synergistic effect in herbicides is always present when the herbicidal action of the active compound combination exceeds the action of the active compounds when applied individually.

The expected activity of a given combination of two or three herbicides can be calculated as follows according to a calculation method by Colby (cf. COLBY, S. R.: "Calculating synergistic and antagonistic responses of herbicide combinations", Weeds 15, pages 20-22, 1967):

If X=% damage by herbicide (A) at an application rate of m g/ha,

Y=% damage by herbicide (B) at an application rate of n g/ha,

E=the expected damage by herbicides (A) and (B) at application rates of m and n kg/ha and, then for a combination:

E=X+Y−(X×Y)/100

If the actual damage exceeds the calculated value, the activity of the combination is superadditive, i.e. it shows a synergistic effect. In this case, the damage actually observed must exceed the values calculated using the above formulae for the expected damage E.

EXAMPLES

The invention is further described by the following non-limiting examples which further illustrate the invention, and are not intended, nor should they be interpreted, to limit the scope of the invention.

Examples 1-5

Herbicidal activity of herbicide compositions according to the first aspect of the present invention with regard to different types of unwanted vegetation was determined during trials performed on test fields (field trials). Individual compositions comprising pyridate and individual compositions comprising a defined 4-HPPD inhibitor are compared with a herbicide composition according to the invention comprising both pyridate and a defined 4-HPPD inhibitor. The expected activity of the combination of the active compounds pyridate and a defined 4-HPPD inhibitor is calculated according to above mentioned calculation method by Colby, in order to evaluate a synergistic effect between pyridate and a defined 4-HPPD inhibitor. If the actual herbicidal activity exceeds the calculated value, the activity of the combination is superadditive, i.e. it shows a synergistic effect.

Herbicidal activity was determined by applying herbicide compositions on emerged unwanted vegetation on fields where maize was cultivated. Pyridate and a defined 4-HPPD inhibitor were applied as a tank mixture by mixing these active compounds prior to use in a spray tank. The corresponding mixture was in the form of a spray liquor. Besides, spray liquors of individual compositions comprising pyridate and of individual compositions comprising a defined 4-HPPD inhibitor were used. Test plants of unwanted vegetation with a growth stage corresponding to BBCH 10-18 (according to the extended BBCH-scale) were sprayed with the active compound preparations such that particular desired amounts of active compounds are applied per unit area. Spray liquor was diluted with water to arrive at an application volume of 50 to 450 L/ha. At a specified number of days after application (DAA), the degree of damage to the unwanted vegetation is rated in % of plants of unwanted vegetation that were killed, which was assessed by visually controlling the plants.

Example 1 concerns a herbicide composition comprising a combination of pyridate and mesotrione, which was applied post-emergence on unwanted vegetation on a field where maize was cultivated, according to the test conditions mentioned above. The results according to Example 1 are shown in Table 1.

TABLE 1

Test results of Example 1, showing herbicidal effect (h.e.) against different types of unwanted vegetation (UVEG) of a herbicide composition according to the first aspect of the present invention comprising pyridate (PYR) and mesotrione (MES), named 'PYR + MES', compared with herbicide compositions comprising PYR or MES individually. Shown data are average values of 1-8 trials. Synergistic effect of 'PYR + MES' is evaluated by comparison against the expected h.e. of the combination of the active compounds calculated according to the calculation method by Colby given above

| UVEG/ DAA*/ number of trials (#) | PYR (g a.c.**/ ha) | PYR h.e. (%) | MES (g a.c./ ha) | MES h.e. (%) | PYR + MES (g a.c. PYR† + g a.c. MES‡) | PYR + MES h.e. (%) | Colby h.e. (%) |
|---|---|---|---|---|---|---|---|
| ATXPA a/ | 300 | 43 | 90 | 97 | 300† + 90‡ | 99 | 98 |
| 24-31 | 600 | 49 | 90 | 97 | 600† + 90‡ | 100 | 99 |
| DAA/ | 300 | 43 | 135 | 97 | 300† + 135‡ | 100 | 98 |
| # = 3 | | | | | | | |
| CAPBP b/ | 300 | 59 | 300 | 97 | 300† + 45‡ | 100 | 99 |
| 14-20 | 600 | 65 | 600 | 97 | 600† + 45‡ | 100 | 99 |
| DAA/ | 900 | 73 | 900 | 97 | 900† + 45‡ | 100 | 99 |
| # = 3 | | | | | | | |
| CAPBP b/ | 300 | 53 | 45 | 97 | 300† + 45‡ | 100 | 99 |
| 24-31 | 600 | 61 | 45 | 97 | 600† + 45‡ | 100 | 99 |
| DAA/ | 900 | 73 | 45 | 97 | 900† + 45‡ | 100 | 99 |
| # = 3 | | | | | | | |
| CONAR c/ | 600 | 40 | 45 | 40 | 600† + 45‡ | 65 | 64 |
| 14-20 | 300 | 35 | 90 | 68 | 300† + 90‡ | 80 | 79 |
| DAA/ | 600 | 40 | 90 | 68 | 600† + 90‡ | 85 | 81 |
| # = 1 | 600 | 40 | 135 | 83 | 600† + 135‡ | 93 | 90 |
| | 900 | 45 | 135 | 83 | 900† + 135‡ | 93 | 91 |
| CONAR c/ | 600 | 48 | 135 | 80 | 600† + 135‡ | 93 | 90 |
| 24-31 | 900 | 45 | 135 | 80 | 900† + 135‡ | 90 | 89 |
| DAA/ | | | | | | | |
| # = 1 | | | | | | | |
| ECHCG d/ | 300 | 10 | 45 | 86 | 300† + 45‡ | 92 | 87 |
| 14-20 | 600 | 23 | 45 | 86 | 600† + 45‡ | 91 | 89 |
| DAA/ | 900 | 31 | 45 | 86 | 900† + 45‡ | 94 | 90 |
| # = 2 | 300 | 10 | 90 | 95 | 300† + 90‡ | 98 | 96 |
| | 900 | 31 | 90 | 95 | 900† + 90‡ | 99 | 97 |
| | 300 | 10 | 135 | 97 | 300† + 135‡ | 98 | 97 |
| | 900 | 31 | 135 | 97 | 900† + 135‡ | 100 | 98 |
| ECHCG d/ | 300 | 0 | 45 | 80 | 300† + 45‡ | 85 | 80 |
| 24-31 | 600 | 3 | 45 | 80 | 600† + 45‡ | 86 | 81 |
| DAA/ | 900 | 20 | 45 | 80 | 900† + 45‡ | 90 | 84 |
| # = 2 | 300 | 0 | 90 | 95 | 300† + 90‡ | 98 | 95 |
| | 600 | 3 | 90 | 95 | 600† + 90‡ | 96 | 95 |
| | 900 | 20 | 90 | 95 | 900† + 90‡ | 100 | 96 |
| | 300 | 0 | 135 | 97 | 300† + 135‡ | 98 | 97 |
| | 600 | 3 | 135 | 97 | 600† + 135‡ | 100 | 97 |
| | 900 | 20 | 135 | 97 | 900† + 135‡ | 100 | 98 |
| EROCC e/ | 300 | 89 | 90 | 32 | 300† + 90‡ | 96 | 93 |
| 14-20 | 300 | 89 | 135 | 33 | 300† + 135‡ | 98 | 93 |
| DAA/ | 600 | 96 | 135 | 33 | 600† + 135‡ | 98 | 97 |
| # = 1 | | | | | | | |
| GALAP f/ | 300 | 20 | 45 | 30 | 300† + 45‡ | 58 | 44 |
| 14-20 | 600 | 30 | 45 | 30 | 600† + 45‡ | 95 | 51 |
| DAA/ | 900 | 35 | 45 | 30 | 900† + 45‡ | 97 | 55 |
| # = 1 | 300 | 20 | 90 | 80 | 300† + 90‡ | 96 | 84 |
| | 600 | 30 | 90 | 80 | 600† + 90‡ | 96 | 86 |
| | 900 | 35 | 90 | 80 | 900† + 90‡ | 98 | 87 |
| | 300 | 20 | 135 | 92 | 300† + 135‡ | 100 | 94 |
| | 600 | 30 | 135 | 92 | 600† + 135‡ | 96 | 94 |
| | 900 | 35 | 135 | 92 | 900† + 135‡ | 98 | 95 |

TABLE 1-continued

Test results of Example 1, showing herbicidal effect (h.e.) against different types of unwanted vegetation (UVEG) of a herbicide composition according to the first aspect of the present invention comprising pyridate (PYR) and mesotrione (MES), named 'PYR + MES', compared with herbicide compositions comprising PYR or MES individually. Shown data are average values of 1-8 trials. Synergistic effect of 'PYR + MES' is evaluated by comparison against the expected h.e. of the combination of the active compounds calculated according to the calculation method by Colby given above

| UVEG/ DAA*/ number of trials (#) | PYR (g a.c.**/ ha) | PYR h.e. (%) | MES (g a.c./ ha) | MES h.e. (%) | PYR + MES (g a.c. PYR† + g a.c. MES‡) | PYR + MES h.e. (%) | Colby h.e. (%) |
|---|---|---|---|---|---|---|---|
| GALAP $^{f/}$ | 300 | 18 | 45 | 40 | 300† + 45‡ | 55 | 51 |
| 24-31 | 600 | 30 | 45 | 40 | 600† + 45‡ | 94 | 58 |
| DAA/ | 900 | 38 | 45 | 40 | 900† + 45‡ | 94 | 63 |
| # = 1 | 300 | 18 | 90 | 90 | 300† + 90‡ | 96 | 92 |
|  | 600 | 30 | 90 | 90 | 600† + 90‡ | 94 | 93 |
|  | 900 | 38 | 90 | 90 | 900† + 90‡ | 96 | 94 |
|  | 300 | 18 | 135 | 91 | 300† + 135‡ | 100 | 93 |
|  | 600 | 30 | 135 | 91 | 600† + 135‡ | 95 | 94 |
|  | 900 | 38 | 135 | 91 | 900† + 135‡ | 99 | 94 |
| KICEL $^{g/}$ | 600 | 0 | 45 | 0 | 600† + 45‡ | 15 | 0 |
| 14-20 | 900 | 0 | 45 | 0 | 900† + 45‡ | 30 | 0 |
| DAA/ | 300 | 0 | 90 | 8 | 300† + 90‡ | 25 | 8 |
| # = 1 | 600 | 0 | 90 | 8 | 600† + 90‡ | 45 | 8 |
|  | 900 | 0 | 90 | 8 | 900† + 90‡ | 60 | 8 |
|  | 300 | 0 | 135 | 0 | 300† + 135‡ | 20 | 0 |
|  | 600 | 0 | 135 | 0 | 600† + 135‡ | 45 | 0 |
|  | 900 | 0 | 135 | 0 | 900† + 135‡ | 70 | 0 |
| KICEL $^{g/}$ | 900 | 0 | 45 | 0 | 900† + 45‡ | 35 | 0 |
| 24-31 | 300 | 0 | 90 | 0 | 300† + 90‡ | 15 | 0 |
| DAA/ | 600 | 0 | 90 | 0 | 600† + 90‡ | 30 | 0 |
| # = 1 | 900 | 0 | 90 | 0 | 900† + 90‡ | 45 | 0 |
|  | 300 | 0 | 135 | 0 | 300† + 135‡ | 25 | 0 |
|  | 600 | 0 | 135 | 0 | 600† + 135‡ | 70 | 0 |
|  | 900 | 0 | 135 | 0 | 900† + 135‡ | 80 | 0 |
| LAMPU $^{h/}$ | 300 | 28 | 45 | 93 | 300† + 45‡ | 98 | 95 |
| 14-20 | 600 | 60 | 45 | 93 | 600† + 45‡ | 98 | 97 |
| DAA/ | 900 | 65 | 45 | 93 | 900† + 45‡ | 100 | 98 |
| # = 2 | 300 | 28 | 90 | 98 | 300† + 90‡ | 100 | 99 |
|  | 600 | 60 | 90 | 98 | 600† + 90‡ | 100 | 99 |
|  | 900 | 65 | 90 | 98 | 900† + 90‡ | 100 | 99 |
|  | 300 | 28 | 135 | 99 | 300† + 135‡ | 100 | 99 |
| LAMPU $^{h/}$ | 300 | 14 | 45 | 89 | 300† + 45‡ | 98 | 91 |
| 24-31 | 600 | 46 | 45 | 89 | 600† + 45‡ | 98 | 94 |
| DAA/ | 900 | 67 | 45 | 89 | 900† + 45‡ | 99 | 96 |
| # = 2 | 300 | 14 | 90 | 95 | 300† + 90‡ | 100 | 96 |
|  | 600 | 46 | 90 | 95 | 600† + 90‡ | 100 | 97 |
|  | 900 | 67 | 90 | 95 | 900† + 90‡ | 100 | 98 |
| MATCH $^{i/}$ | 300 | 25 | 45 | 53 | 300† + 45‡ | 79 | 65 |
| 14-20 | 600 | 45 | 45 | 53 | 600† + 45‡ | 91 | 74 |
| DAA/ | 900 | 61 | 45 | 53 | 900† + 45‡ | 92 | 82 |
| # = 2 | 300 | 25 | 90 | 72 | 300† + 90‡ | 93 | 79 |
|  | 600 | 45 | 90 | 72 | 600† + 90‡ | 94 | 85 |
|  | 900 | 61 | 90 | 72 | 900† + 90‡ | 94 | 89 |
|  | 300 | 25 | 135 | 81 | 300† + 135‡ | 95 | 86 |
|  | 600 | 45 | 135 | 81 | 600† + 135‡ | 98 | 90 |
|  | 900 | 61 | 135 | 81 | 900† + 135‡ | 98 | 93 |
| MATCH $^{i/}$ | 300 | 5 | 45 | 43 | 300† + 45‡ | 84 | 46 |
| 24-31 | 600 | 26 | 45 | 43 | 600† + 45‡ | 92 | 58 |
| DAA/ | 900 | 39 | 45 | 43 | 900† + 45‡ | 93 | 65 |
| # = 2 | 300 | 5 | 90 | 77 | 300† + 90‡ | 88 | 78 |
|  | 600 | 26 | 90 | 77 | 600† + 90‡ | 91 | 83 |
|  | 900 | 39 | 90 | 77 | 900† + 90‡ | 94 | 86 |
|  | 900 | 39 | 135 | 93 | 900† + 135‡ | 97 | 96 |
| MATIN $^{j/}$ | 300 | 75 | 45 | 80 | 300† + 45‡ | 100 | 95 |
| 24-31 | 600 | 60 | 45 | 80 | 600† + 45‡ | 100 | 92 |
| DAA/ | 900 | 55 | 45 | 80 | 900† + 45‡ | 100 | 91 |
| # = 1 |  |  |  |  |  |  |  |
| MERAN $^{k/}$ | 300 | 48 | 45 | 95 | 300† + 45‡ | 100 | 97 |
| 14-20 | 600 | 78 | 45 | 95 | 600† + 45‡ | 100 | 99 |
| DAA/ |  |  |  |  |  |  |  |
| # = 1 |  |  |  |  |  |  |  |

TABLE 1-continued

Test results of Example 1, showing herbicidal effect (h.e.) against
different types of unwanted vegetation (UVEG) of a herbicide composition
according to the first aspect of the present invention comprising pyridate
(PYR) and mesotrione (MES), named 'PYR + MES', compared with herbicide
compositions comprising PYR or MES individually. Shown data are average
values of 1-8 trials. Synergistic effect of 'PYR + MES' is evaluated by
comparison against the expected h.e. of the combination of the active
compounds calculated according to the calculation method by Colby given
above

| UVEG/ DAA*/ number of trials (#) | PYR (g a.c.**/ ha) | PYR h.e. (%) | MES (g a.c./ ha) | MES h.e. (%) | PYR + MES (g a.c. PYR† + g a.c. MES‡) | PYR + MES h.e. (%) | Colby h.e. (%) |
|---|---|---|---|---|---|---|---|
| MERAN $^{k/}$ | 300 | 10 | 45 | 70 | 300† + 45‡ | 100 | 73 |
| 24-31 | 600 | 33 | 45 | 70 | 600† + 45‡ | 100 | 80 |
| DAA/ | 900 | 80 | 45 | 70 | 900† + 45‡ | 100 | 94 |
| # = 1 | | | | | | | |
| POAAN $^{l/}$ | 300 | 7 | 45 | 24 | 300† + 45‡ | 44 | 29 |
| 14-20 | 600 | 17 | 45 | 24 | 600† + 45‡ | 48 | 37 |
| DAA/ | 900 | 36 | 45 | 24 | 900† + 45‡ | 55 | 51 |
| # = 5 | 300 | 7 | 90 | 48 | 300† + 90‡ | 59 | 52 |
| | 600 | 17 | 90 | 48 | 600† + 90‡ | 68 | 57 |
| | 900 | 36 | 90 | 48 | 900† + 90‡ | 77 | 67 |
| | 300 | 7 | 135 | 58 | 300† + 135‡ | 69 | 61 |
| | 600 | 17 | 135 | 58 | 600† + 135‡ | 77 | 65 |
| | 900 | 36 | 135 | 58 | 900† + 135‡ | 79 | 73 |
| POAAN $^{l/}$ | 300 | 5 | 45 | 17 | 300† + 45‡ | 27 | 21 |
| 24-31 | 600 | 13 | 45 | 17 | 600† + 45‡ | 45 | 28 |
| DAA/ | 900 | 28 | 45 | 17 | 900† + 45‡ | 52 | 40 |
| # = 6 | 300 | 5 | 90 | 22 | 300† + 90‡ | 39 | 26 |
| | 600 | 13 | 90 | 22 | 600† + 90‡ | 53 | 32 |
| | 900 | 28 | 90 | 22 | 900† + 90‡ | 63 | 44 |
| | 300 | 5 | 135 | 38 | 300† + 135‡ | 62 | 41 |
| | 600 | 13 | 135 | 38 | 600† + 135‡ | 63 | 46 |
| | 900 | 28 | 135 | 38 | 900† + 135‡ | 69 | 55 |
| POLAV $^{m/}$ | 300 | 18 | 45 | 61 | 300† + 45‡ | 70 | 68 |
| 14-20 | 300 | 18 | 90 | 76 | 300† + 90‡ | 81 | 80 |
| DAA/ | | | | | | | |
| # = 5 | | | | | | | |
| POLAV $^{m/}$ | 300 | 17 | 90 | 58 | 300† + 90‡ | 68 | 65 |
| 24-31 | | | | | | | |
| DAA/ | | | | | | | |
| # = 5 | | | | | | | |
| POLCO $^{n/}$ | 300 | 31 | 45 | 77 | 300† + 45‡ | 92 | 84 |
| 14-20 | 600 | 34 | 45 | 77 | 600† + 45‡ | 96 | 85 |
| DAA/ | 900 | 47 | 45 | 77 | 900† + 45‡ | 95 | 88 |
| # = 3 | 300 | 31 | 90 | 89 | 300† + 90‡ | 98 | 92 |
| | 600 | 34 | 90 | 89 | 600† + 90‡ | 98 | 93 |
| | 900 | 47 | 90 | 89 | 900† + 90‡ | 98 | 94 |
| POLCO $^{n/}$ | 300 | 29 | 45 | 80 | 300† + 45‡ | 91 | 86 |
| 24-31 | 600 | 29 | 45 | 80 | 600† + 45‡ | 98 | 86 |
| DAA/ | 900 | 43 | 45 | 80 | 900† + 45‡ | 91 | 89 |
| # = 3 | 900 | 43 | 135 | 97 | 900† + 135‡ | 99 | 98 |
| POLPE $^{o/}$ | 300 | 15 | 45 | 83 | 300† + 45‡ | 98 | 86 |
| 14-20 | 600 | 23 | 45 | 83 | 600† + 45‡ | 100 | 87 |
| DAA/ | 900 | 28 | 45 | 83 | 900† + 45‡ | 100 | 88 |
| # = 2 | 300 | 15 | 90 | 98 | 300† + 90‡ | 100 | 98 |
| | 600 | 23 | 90 | 98 | 600† + 90‡ | 100 | 98 |
| | 900 | 28 | 90 | 98 | 900† + 90‡ | 100 | 99 |
| | 300 | 15 | 135 | 98 | 300† + 135‡ | 100 | 98 |
| | 600 | 23 | 135 | 98 | 600† + 135‡ | 100 | 98 |
| | 900 | 28 | 135 | 98 | 900† + 135‡ | 100 | 99 |
| POLPE $^{o/}$ | 300 | 17 | 45 | 93 | 300† + 45‡ | 98 | 94 |
| 24-31 | 600 | 33 | 45 | 93 | 600† + 45‡ | 99 | 95 |
| DAA/ | 900 | 32 | 45 | 93 | 900† + 45‡ | 98 | 95 |
| # = 3 | | | | | | | |
| RUMOB $^{p/}$ | 300 | 20 | 45 | 87 | 300† + 45‡ | 97 | 90 |
| 14-20 | 600 | 30 | 45 | 87 | 600† + 45‡ | 97 | 91 |
| DAA/ | 900 | 55 | 45 | 87 | 900† + 45‡ | 96 | 94 |
| # = 1 | 300 | 20 | 90 | 95 | 300† + 90‡ | 100 | 96 |
| | 600 | 30 | 90 | 95 | 600† + 90‡ | 100 | 97 |
| | 900 | 55 | 90 | 95 | 900† + 90‡ | 100 | 98 |
| | 300 | 20 | 135 | 95 | 300† + 135‡ | 100 | 96 |
| | 600 | 30 | 135 | 95 | 600† + 135‡ | 100 | 97 |
| | 900 | 55 | 135 | 95 | 900† + 135‡ | 100 | 98 |
| SETVE $^{q/}$ | 300 | 29 | 45 | 21 | 300† + 45‡ | 88 | 44 |
| 14-20 | 600 | 47 | 45 | 21 | 600† + 45‡ | 94 | 58 |

TABLE 1-continued

Test results of Example 1, showing herbicidal effect (h.e.) against different types of unwanted vegetation (UVEG)of a herbicide composition according to the first aspect of the present invention comprising pyridate (PYR) and mesotrione (MES), named 'PYR + MES', compared with herbicide compositions comprising PYR or MES individually. Shown data are average values of 1-8 trials. Synergistic effect of 'PYR + MES' is evaluated by comparison against the expected h.e. of the combination of the active compounds calculated according to the calculation method by Colby given above

| UVEG/ DAA*/ number of trials (#) | PYR (g a.c.**/ ha) | PYR h.e. (%) | MES (g a.c./ ha) | MES h.e. (%) | PYR + MES (g a.c. PYR† + g a.c. MES‡) | PYR + MES h.e. (%) | Colby h.e. (%) |
|---|---|---|---|---|---|---|---|
| DAA/ | 900 | 75 | 45 | 21 | 900† + 45‡ | 96 | 80 |
| # = 2 | 300 | 29 | 90 | 41 | 300† + 90‡ | 96 | 58 |
| | 600 | 47 | 90 | 41 | 600† + 90‡ | 97 | 69 |
| | 900 | 75 | 90 | 41 | 900† + 90‡ | 98 | 85 |
| | 300 | 29 | 135 | 55 | 300† + 135‡ | 98 | 68 |
| | 600 | 47 | 135 | 55 | 600† + 135‡ | 99 | 76 |
| | 900 | 75 | 135 | 55 | 900† + 135‡ | 99 | 89 |
| SETVE q/ | 300 | 29 | 45 | 31 | 300† + 45‡ | 80 | 51 |
| 24-31 | 600 | 33 | 45 | 31 | 600† + 45‡ | 86 | 54 |
| DAA/ | 900 | 60 | 45 | 31 | 900† + 45‡ | 89 | 72 |
| # = 2 | 300 | 29 | 90 | 37 | 300† + 90‡ | 89 | 55 |
| | 600 | 33 | 90 | 37 | 600† + 90‡ | 94 | 58 |
| | 900 | 60 | 90 | 37 | 900† + 90‡ | 97 | 75 |
| | 300 | 29 | 135 | 58 | 300† + 135‡ | 97 | 70 |
| | 600 | 33 | 135 | 58 | 600† + 135‡ | 96 | 72 |
| | 900 | 60 | 135 | 58 | 900† + 135‡ | 97 | 83 |
| SETVI r/ | 300 | 10 | 45 | 83 | 300† + 45‡ | 90 | 85 |
| 14-20 | 600 | 20 | 45 | 83 | 600† + 45‡ | 90 | 86 |
| DAA/ | 900 | 25 | 45 | 83 | 900† + 45‡ | 90 | 87 |
| # = 1 | 900 | 25 | 90 | 92 | 900† + 90‡ | 99 | 94 |
| | 600 | 20 | 135 | 95 | 600† + 135‡ | 97 | 96 |
| | 900 | 25 | 135 | 95 | 900† + 135‡ | 100 | 96 |
| SETVI r/ | 300 | 0 | 45 | 72 | 300† + 45‡ | 77 | 72 |
| 24-31 | 600 | 0 | 45 | 72 | 600† + 45‡ | 80 | 72 |
| DAA/ | 900 | 0 | 45 | 72 | 900† + 45‡ | 85 | 72 |
| # = 1 | 900 | 0 | 90 | 92 | 900† + 90‡ | 100 | 92 |
| | 600 | 0 | 135 | 95 | 600† + 135‡ | 100 | 95 |
| | 900 | 0 | 135 | 95 | 900† + 135‡ | 100 | 95 |
| SOLNI s/ | 300 | 75 | 45 | 95 | 300† + 45‡ | 100 | 95 |
| 14-20 | 600 | 88 | 45 | 95 | 600† + 45‡ | 100 | 95 |
| DAA/ | | | | | | | |
| # = 3 | | | | | | | |
| STEME t/ | 300 | 18 | 45 | 78 | 300† + 45‡ | 89 | 82 |
| 14-20 | 600 | 42 | 45 | 78 | 600† + 45‡ | 98 | 87 |
| DAA/ | 900 | 55 | 45 | 78 | 900† + 45‡ | 98 | 90 |
| # = 8 | 300 | 18 | 90 | 93 | 300† + 90‡ | 95 | 94 |
| | 600 | 42 | 90 | 93 | 600† + 90‡ | 99 | 96 |
| | 900 | 55 | 90 | 93 | 900† + 90‡ | 99 | 97 |
| | 300 | 18 | 135 | 93 | 300† + 135‡ | 98 | 94 |
| | 600 | 42 | 135 | 93 | 600† + 135‡ | 98 | 96 |
| | 900 | 55 | 135 | 93 | 900† + 135‡ | 100 | 97 |
| STEME t/ | 300 | 16 | 45 | 70 | 300† + 45‡ | 86 | 75 |
| 24-31 | 600 | 30 | 45 | 70 | 600† + 45‡ | 95 | 79 |
| DAA/ | 900 | 50 | 45 | 70 | 900† + 45‡ | 97 | 85 |
| # = 8 | 300 | 16 | 90 | 87 | 300† + 90‡ | 94 | 89 |
| | 600 | 30 | 90 | 87 | 600† + 90‡ | 96 | 91 |
| | 900 | 50 | 90 | 87 | 900† + 90‡ | 98 | 94 |
| | 300 | 16 | 135 | 93 | 300† + 135‡ | 98 | 94 |
| | 600 | 30 | 135 | 93 | 600† + 135‡ | 96 | 95 |
| | 900 | 50 | 135 | 93 | 900† + 135‡ | 99 | 97 |
| VERPE u/ | 300 | 0 | 45 | 20 | 300† + 45‡ | 75 | 20 |
| 14-20 | 600 | 20 | 45 | 20 | 600† + 45‡ | 75 | 36 |
| DAA/ | 900 | 40 | 45 | 20 | 900† + 45‡ | 95 | 52 |
| # = 1 | 300 | 0 | 90 | 75 | 300† + 90‡ | 85 | 75 |
| | 900 | 40 | 90 | 75 | 900† + 90‡ | 100 | 85 |
| | 300 | 0 | 135 | 70 | 300† + 135‡ | 100 | 70 |
| | 600 | 20 | 135 | 70 | 600† + 135‡ | 95 | 76 |
| | 900 | 40 | 135 | 70 | 900† + 135‡ | 85 | 82 |

TABLE 1-continued

Test results of Example 1, showing herbicidal effect (h.e.) against different types of unwanted vegetation (UVEG) of a herbicide composition according to the first aspect of the present invention comprising pyridate (PYR) and mesotrione (MES), named 'PYR + MES', compared with herbicide compositions comprising PYR or MES individually. Shown data are average values of 1-8 trials. Synergistic effect of 'PYR + MES' is evaluated by comparison against the expected h.e. of the combination of the active compounds calculated according to the calculation method by Colby given above

| UVEG/ DAA*/ number of trials (#) | PYR (g a.c.**/ ha) | PYR h.e. (%) | MES (g a.c./ ha) | MES h.e. (%) | PYR + MES (g a.c. PYR† + g a.c. MES‡) | PYR + MES h.e. (%) | Colby h.e. (%) |
|---|---|---|---|---|---|---|---|
| VERPE u/ | 300 | 10 | 45 | 10 | 300† + 45‡ | 75 | 19 |
| 24-31 | 600 | 0 | 45 | 10 | 600† + 45‡ | 70 | 10 |
| DAA/ | 900 | 0 | 45 | 10 | 900† + 45‡ | 85 | 10 |
| # = 1 | 300 | 10 | 90 | 55 | 300† + 90‡ | 65 | 60 |
|  | 600 | 0 | 90 | 55 | 600† + 90‡ | 65 | 55 |
|  | 900 | 0 | 90 | 55 | 900† + 90‡ | 90 | 55 |
|  | 300 | 10 | 135 | 60 | 300† + 135‡ | 85 | 64 |
|  | 600 | 0 | 135 | 60 | 600† + 135‡ | 95 | 60 |
|  | 900 | 0 | 135 | 60 | 900† + 135‡ | 80 | 60 |
| VIOAR v/ | 600 | 34 | 45 | 84 | 600† + 45‡ | 99 | 89 |
| 14-20 | 900 | 50 | 45 | 84 | 900† + 45‡ | 99 | 92 |
| DAA/ | 300 | 31 | 90 | 95 | 300† + 90‡ | 98 | 97 |
| # = 3 | 600 | 34 | 90 | 95 | 600† + 90‡ | 99 | 97 |
|  | 600 | 34 | 135 | 98 | 600† + 135‡ | 100 | 99 |
|  | 900 | 50 | 135 | 98 | 900† + 135‡ | 100 | 99 |
| VIOAR v/ | 300 | 27 | 45 | 70 | 300† + 45‡ | 84 | 78 |
| 14-20 | 600 | 34 | 45 | 70 | 600† + 45‡ | 97 | 80 |
| DAA/ | 900 | 47 | 45 | 70 | 900† + 45‡ | 98 | 84 |
| # = 3 | 300 | 27 | 90 | 84 | 300† + 90‡ | 93 | 88 |
|  | 600 | 34 | 90 | 84 | 600† + 90‡ | 96 | 89 |
|  | 300 | 27 | 135 | 87 | 300† + 135‡ | 95 | 91 |
|  | 600 | 34 | 135 | 87 | 600† + 135‡ | 96 | 91 |
|  | 900 | 47 | 135 | 87 | 900† + 135‡ | 98 | 93 |

*DAA = days after application;
**a.c. = active compound;
a ATXPA = *Atriplex patula*;
b CAPBP = *Capsella bursa-pastoris*;
c CONAR = *Convolvulus arvensis*;
d ECHCG = *Echinochloa crus-galli*;
e EROCC = *Erodium ciconium*;
f GALAP = *Galium aparine*;
g KICEL = *Kickxia elatine*;
h LAMPU = *Lamium purpureum*;
i MATCH = *Matricaria chamomilla*;
j MATIN = *Tripleurospermum inodorum*;
k MERAN = *Mercurialis annua*;
l POAAN = *Poa annua*;
m POLAV = *Polygonum aviculare*;
n POLCO = *Fallopia convolvulus*;
o POLPE = *Persicaria maculosa*;
p RUMOB = *Rumex obtusifolius*;
q SETVE = *Setaria verticillata*;
r SETVI = *Setaria viridis*;
s SOLNI = *Solanum nigrum*;
t STEME = *Stellaria media*;
u VERPE = *Veronica persica*;
v VIOAR = *Viola arvensis*

Example 2 concerns a herbicide composition comprising a combination of pyridate and mesotrione, which was applied post-emergence on unwanted vegetation on a field where maize was cultivated, according to the test conditions mentioned above. The results according to Example 2 are shown in Table 2.

TABLE 2

Test results of Example 2, showing herbicidal effect (h.e.) against different types of unwanted vegetation (UVEG) of a herbicide composition according to the first aspect of the present invention comprising pyridate (PYR) and mesotrione (MES), named 'PYR + MES', compared with herbicide compositions comprising PYR or MES individually. Shown data are average values of 1-14 trials. Synergistic effect of 'PYR + MES' is evaluated by comparison against the expected h.e. of the combination of the individual active compounds calculated according to the calculation method by Colby given above

| UVEG/DAA*/ number of trials (#) | PYR (300 g a.c.**/ha) h.e. (%) | MES (100 g a.c./ha) h.e. (%) | PYR + MES (300 g a.c. PYR/ha + 90 g a.c. MES/ha) h.e. (%) | Colby (based on results for 300 g a.c. PYR/ha and 100 g a.c. MES/ha) h.e. (%) |
|---|---|---|---|---|
| ABUTH [a]/31-48 DAA/# = 2 | 73 | 91 | 99 | 98 |
| ANGAR [b]/7-14 DAA/# = 2 | 6 | 98 | 100 | 98 |
| BRSNN [c]/7-14 DAA/# = 1 | 50 | 86 | 94 | 93 |
| BRSNN [c]/18-28 DAA/# = 1 | 11 | 85 | 90 | 87 |
| BRSNN [c]/31-48 DAA/# = 1 | 6 | 84 | 87 | 85 |
| BRSNW [d]/7-14 DAA/# = 1 | 5 | 98 | 100 | 98 |
| BRSNW [d]/18-28 DAA/ # = 1 | 5 | 99 | 100 | 99 |
| CAPBP [e]/7-14 DAA/# = 3 | 51 | 90 | 97 | 95 |
| CIRAR [f]/7-14 DAA/# = 1 | 23 | 58 | 71 | 68 |
| CIRAR [f]/31-48 DAA/# = 1 | 49 | 78 | 91 | 89 |
| DATST [g]/7-14/# = 2 | 70 | 98 | 100 | 99 |
| DIGSA [h]/7-14 DAA/# = 2 | 30 | 53 | 80 | 67 |
| DIGSA [h]/18-28 DAA/# = 2 | 24 | 47 | 79 | 60 |
| DIGSA [h]/31-48 DAA/# = 1 | 48 | 54 | 89 | 76 |
| ECHCG [i]/7-14 DAA/# = 9 | 20 | 67 | 77 | 74 |
| ECHCG [i]/18-28 DAA/ # = 14 | 23 | 51 | 71 | 62 |
| ECHCG [i]/31-48 DAA/# = 13 | 23 | 50 | 66 | 62 |
| GASPA [j]/31-48 DAA/# = 3 | 40 | 97 | 99 | 98 |
| GERSS [k]/7-14 DAA/# = 1 | 13 | 44 | 63 | 51 |
| GERSS [k]/18-28 DAA/# = 1 | 0 | 41 | 66 | 41 |
| GERSS [k]/31-48 DAA/# = 1 | 0 | 31 | 73 | 31 |
| HIBTR [l]/7-14 DAA/# = 2 | 36 | 62 | 78 | 76 |
| MATIN [m]/7-14 DAA/# = 1 | 3 | 77 | 100 | 78 |
| MATIN [m]/18-28 DAA/# = 1 | 5 | 78 | 100 | 79 |
| MATIN [m]/31-48 DAA/# = 1 | 5 | 80 | 100 | 81 |
| PAPRH [n]/18-28 DAA/# = 1 | 3 | 80 | 99 | 81 |
| PAPRH [n]/31-48 DAA/# = 1 | 3 | 89 | 99 | 89 |
| POAAN [o]/7-14 DAA/# = 2 | 25 | 39 | 67 | 54 |
| POAAN [o]/18-28 DAA/# = 3 | 17 | 36 | 59 | 47 |
| POAAN [o]/31-48 DAA/# = 2 | 17 | 27 | 69 | 39 |
| POLCO [p]/7-14 DAA/# = 5 | 26 | 68 | 86 | 76 |
| POLCO [p]/18-28 DAA/# = 8 | 32 | 77 | 92 | 84 |
| POLCO [p]/31-48 DAA/# = 8 | 27 | 68 | 86 | 77 |
| POLPE [q]/7-14 DAA/# = 3 | 42 | 91 | 97 | 95 |
| POLPE [q]/31-48 DAA/# = 4 | 32 | 89 | 95 | 93 |
| POROL [r]/7-14 DAA/# = 1 | 30 | 50 | 80 | 65 |
| POROL [r]/18-28 DAA/# = 1 | 11 | 5 | 41 | 15 |
| SOLNI [s]/18-28 DAA/# = 7 | 58 | 91 | 97 | 96 |
| SOLNI [s]/31-48 DAA/# = 6 | 55 | 93 | 98 | 97 |
| SONOL [t]/7-14 DAA/# = 1 | 93 | 90 | 100 | 99 |
| SONOL [t]/18-28 DAA/# = 1 | 51 | 54 | 94 | 77 |
| SONOL [t]/31-48 DAA/# = 1 | 37 | 41 | 88 | 63 |
| SORHA [u]/7-14 DAA/# = 1 | 58 | 42 | 100 | 76 |
| STAAR [v]/7-14 DAA/# = 1 | 35 | 54 | 79 | 70 |
| STEME [w]/18-28 DAA/# = 4 | 35 | 98 | 100 | 99 |
| THLAR [x]/7-14 DAA/# = 1 | 28 | 76 | 85 | 83 |
| THLAR [x]/18-28 DAA/# = 1 | 19 | 97 | 100 | 98 |
| VERPE [y]/7-14 DAA/# = 4 | 58 | 91 | 100 | 96 |
| VERPE [y]/31-48 DAA/# = 5 | 44 | 93 | 99 | 96 |
| XANSP [z]/7-14 DAA/# = 3 | 5 | 97 | 100 | 97 |

*DAA = days after application;
**a.c. = active compound;
[a] ABUTH = *Abutilon theophrasti*;
[b] ANGAR = *Anagallis arvensis*;
[c] BRSNN = *Brassica napus*;
[d] BRSNW = *Brassica napus* (winter);
[e] CAPBP = *Capsella bursa-pastoris*;
[f] CIRAR = *Cirsium arvense*;
[g] DATST = *Datura stramonium*;
[h] DIGSA = *Digitaria sanguinalis*;
[i] ECHCG = *Echinochloa crus-galli*;
[j] GASPA = *Galinsoga parviflora*;
[k] GERSS = *Geranium* sp.;
[l] HIBTR = *Hibiscus ternatus*;
[m] MATIN = *Tripleurospermum inodorum*;
[n] PAPRH = *Papaver rhoeas*;
[o] POAAN = *Poa annua*;
[p] POLCO = *Fallopia convolvulus*;
[q] POLPE = *Persicaria maculosa*;
[r] POROL = *Portulaca oleracea*;
[s] SOLNI = *Solanum nigrum*;
[t] SONOL = *Sonchus oleraceus*;
[u] SORHA = *Sorghum halepense*;
[v] STAAR = *Stachys arvensis*;
[w] STEME = *Stellaria media*;
[x] THLAR = *Thlaspi arvense*;
[y] VERPE = *Veronica persica*;
[z] XANSP = *Xanthium spinosum*

Example 3 concerns a herbicide composition comprising a combination of pyridate and mesotrione, which was applied post-emergence on unwanted vegetation on a field where maize was cultivated, according to the test conditions mentioned above. The results according to Example 3 are shown in Table 3.

TABLE 3

Test results of Example 3, showing herbicidal effect (h.e.) against different types of unwanted vegetation (UVEG) of a herbicide composition according to the first aspect of the present invention comprising pyridate (PYR) and mesotrione (MES), named 'PYR + MES', compared with herbicide compositions comprising PYR or MES individually. Shown data correspond to results of one trial. Synergistic effect of 'PYR + MES' is evaluated by comparison against the expected h.e. of the combination of the active compounds calculated according to the calculation method by Colby given above

| UVEG/DAA*/ number of trials (#) | PYR (450 g a.c.**/ha) h.e. (%) | MES (144 g a.c./ha) h.e. (%) | PYR + MES (450 g a.c. PYR/ha + 144 g a.c. MES/ha) h.e. (%) | Colby h.e. (%) |
|---|---|---|---|---|
| AMARE $^a$/13-14 DAA/# = 1 | 72 | 45 | 100 | 85 |
| BRSRC $^b$/13-14 DAA/# = 1 | 48 | 88 | 99 | 94 |
| POLCO $^c$/13-14 DAA/# = 1 | 23 | 92 | 97 | 94 |

*DAA = days after application;
**a.c. = active compound;
$^a$ AMARE = *Amaranthus retroflexus*;
$^b$ BRSRC = *Brassica rapa Canola* cultivars;
$^c$ POLCO = *Fallopia convolvulus*

Example 4 concerns a herbicide composition comprising a combination of pyridate and topramezone, which was applied post-emergence on unwanted vegetation on a field where maize was cultivated, according to the test conditions mentioned above. The results according to Example 4 are shown in Table 4.

TABLE 4

Test results of Example 4, showing herbicidal effect (h.e.) against different types of unwanted vegetation (UVEG) of a herbicide composition according to the first aspect of the present invention comprising pyridate (PYR) and topramezone (TOP), named 'PYR + TOP', compared with herbicide compositions comprising PYR or TOP individually. Shown data correspond to results of one trial. Synergistic effect of 'PYR + TOP is evaluated by comparison against the expected h.e. of the combination of the active compounds calculated according to the calculation method by Colby given above

| UVEG/DAA*/ number of trials (#) | PYR (450 g a.c.**/ha) h.e. (%) | TOP (12.4 g a.c./ha) h.e. (%) | PYR + TOP (450 g a.c. PYR/ha + 12.4 g a.c. TOP/ha) h.e. (%) | Colby h.e. (%) |
|---|---|---|---|---|
| AMARE $^a$/13-14 DAA/# = 1 | 72 | 18 | 83 | 77 |
| BRSRC $^b$/13-14 DAA/# = 1 | 48 | 50 | 96 | 74 |
| CHEAL $^c$/13-14 DAA/# = 1 | 35 | 1 | 66 | 36 |
| SINAR $^d$/13-14 DAA/# = 1 | 57 | 50 | 98 | 79 |

*DAA = days after application;
**a.c. = active compound;
$^a$ AMARE = *Amaranthus retroflexus*;
$^b$ BRSRC = *Brassica rapa Canola* cultivars;
$^c$ CHEAL = *Chenopodium album*;
$^d$ SINAR = *Sinapis arvensis*

Example 5 concerns a herbicide composition comprising a combination of pyridate and tembotrione, which was applied post-emergence on unwanted vegetation on a field where maize was cultivated, according to the test conditions mentioned above. The results according to Example 5 are shown in Table 5.

TABLE 5

Test results of Example 5, showing herbicidal effect (h.e.) against different types of unwanted vegetation (UVEG) of a herbicide composition according to the first aspect of the present invention comprising pyridate (PYR) and tembotrione (TEM), named 'PYR + TEM', compared with herbicide compositions comprising PYR or TEM individually. Shown data are average values of 1-2 trials. Synergistic effect of 'PYR + TEM is evaluated by comparison against the expected h.e. of the combination of the active compounds calculated according to the calculation method by Colby given above

| UVEG/DAA*/ number of trials (#) | PYR (450 g a.c.**/ha) h.e. (%) | TEM (38 g a.c./ha) h.e. (%) | PYR + TEM (450 g a.c. PYR/ha + 38 g a.c. TEM/ha) h.e. (%) | Colby h.e. (%) |
|---|---|---|---|---|
| CHEAL $^a$/13-14 DAA/# = 1 | 49 | 0 | 64 | 49 |
| KCHSC $^b$/13-14 DAA/# = 2 | 66 | 40 | 86 | 80 |

*DAA = days after application;
**a.c. = active compound;
$^a$ CHEAL = *Chenopodium album*;
$^b$ KCHSC = *Bassia scoparia*

TABLE 6

Test results of Example 6, showing herbicidal effect (h.e.) against different types of unwanted vegetation (UVEG) of a herbicide composition according to the first aspect of the present invention comprising pyridate (PYR) and tembotrione (TEM), named 'PYR + TEM', compared with herbicide compositions comprising PYR or TEM individually. Shown data are average values of 1-14 trials. Synergistic effect of 'PYR + TEM' is evaluated by comparison against the expected h.e. of the combination of the active compounds calculated according to the calculation method by Colby given above

| UVEG/ DAA* | PYR (g a.c.**/ ha) | PYR h.e. (%) | TEM (g a.c./ha) | TEM h.e. (%) | PYR + TEM (g a.c. PYR† + g a.c. TEM‡) | PYR + TEM h.e. (%) | Colby h.e.(%) |
|---|---|---|---|---|---|---|---|
| VERPE $^a$/ | 300 | 10 | 100 | 53 | 300† + 100‡ | 45 | 57.7 |
| 7 DAA/ | 900 | 50 | 44 | 53 | 900† + 44‡ | 85 | 76.5 |
|  | 10 | 0 | 22 | 8 | 10† + 100‡ | 13 | 53 |
|  |  |  |  |  | 900† + 22‡ | 60 | 54 |
| SOLNI $^b$/ | 300 | 10 | 100 | 80 | 300† + 100‡ | 98 | 82 |
| 7 DAA/ | 900 | 100 | 44 | 85 | 900† + 44‡ | 100 | 100 |
|  | 10 | 0 | 22 | 40 | 10† + 100‡ | 78 | 80 |
|  |  |  |  |  | 900† + 22‡ | 99 | 100 |
| GERDI $^c$/ | 300 | 5 | 100 | 33 | 300† + 100‡ | 53 | 36.4 |
| 7 DAA/ | 900 | 10 | 44 | 20 | 900† + 44‡ | 40 | 28 |
|  | 10 | 0 | 22 | 8 | 10† + 100‡ | 15 | 33 |
|  |  |  |  |  | 900† + 22‡ | 38 | 17.2 |
| MATCH $^d$/ | 300 | 0 | 100 | 100 | 300† + 100‡ | 80 | 100 |
| 7 DAA/ | 900 | 0 | 44 | 70 | 900† + 44‡ | 95 | 70 |
|  | 10 | 0 | 22 | 15 | 10† + 100‡ | 100 | 100 |
|  |  |  |  |  | 900† + 22‡ | 20 | 15 |
| ECHCG $^e$/ | 300 | 0 | 100 | 85 | 300† + 100‡ | 96 | 85 |
| 7 DAA/ | 900 | 5 | 44 | 95 | 900† + 44‡ | 97 | 95.3 |
|  | 10 | 0 | 22 | 83 | 10† + 100‡ | 94 | 85 |
|  |  |  |  |  | 900† + 22‡ | 99 | 83.9 |
| POAAN $^f$/ | 300 | 10 | 100 | 32 | 300† + 100‡ | 62 | 38.8 |
| 7 DAA/ | 900 | 0 | 44 | 13 | 900† + 44‡ | 87 | 13 |
|  | 10 | 0 | 22 | 10 | 10† + 100‡ | 22 | 32 |
|  |  |  |  |  | 900† + 22‡ | 3 | 10 |
| CHEAL $^g$/ | 300 | 5 | 100 | 78 | 300† + 100‡ | 99 | 79.1 |
| 7 DAA/ | 900 | 90 | 44 | 96 | 900† + 44‡ | 100 | 99.6 |
|  | 10 | 0 | 22 | 68 | 10† + 100‡ | 78 | 78 |
|  |  |  |  |  | 900† + 22‡ | 97 | 96.8 |
| LAMAM $^h$/ | 300 | 5 | 100 | 40 | 300† + 100‡ | 100 | 43 |
| 7 DAA/ | 900 | 10 | 44 | 100 | 900† + 44‡ | 100 | 100 |
|  | 10 | 0 | 22 | 25 | 10† + 100‡ | 40 | 40 |
|  |  |  |  |  | 900† + 22‡ | 100 | 32.5 |
| DIGSA $^i$/ | 300 | 5 | 100 | 99 | 300† + 100‡ | 100 | 99.1 |
| 7 DAA/ | 900 | 0 | 44 | 95 | 900† + 44‡ | 100 | 95 |
|  | 10 | 0 | 22 | 59 | 10† + 100‡ | 100 | 99 |
|  |  |  |  |  | 900† + 22‡ | 98 | 59 |
| SETVE $^j$/ | 300 | 0 | 100 | 100 | 300† + 100‡ | 100 | 100 |
| 7 DAA/ | 900 | 0 | 44 | 18 | 900† + 44‡ | 100 | 18 |
|  | 10 | 0 | 22 | 0 | 10† + 100‡ | 100 | 100 |
|  |  |  |  |  | 900† + 22‡ | 10 | 0 |

*DAA = days after application;
**a.c. = active compound;
$^a$ VERPE = *Veronica persica*;
$^b$ SOLNI = *Solanum nigrum*;
$^c$ GERDI = *Geranium dissectum*;
$^d$ MATCH = *Matricaria chamomilla*;
$^e$ ECHCG = *Echinochloa crus-galli*;
$^f$ POAAN = *Poa annua*;
$^g$ CHEAL = *Chenopodium album*;
h LAMAM = *Lamium amplexicaule*;
$^i$ DIGSA = *Digitaria sanguinalis*;
$^j$ SETVE = *Setaria verticillata*.

TABLE 7

Test results of Example 7, showing herbicidal effect (h.e.) against different types of unwanted vegetation (UVEG) of a herbicide composition according to the first aspect of the present invention comprising pyridate (PYR) and sulcotrione (SCT), named 'PYR + SCT', compared with herbicide compositions comprising PYR or SCT individually. Shown data are average values of 1-14 trials. Synergistic effect of 'PYR + SCT' is evaluated by comparison against the expected h.e. of the combination of the active compounds calculated according to the calculation method by Colby given above

| UVEG/ DAA* | PYR (g a.c.**/ ha) | PYR h.e. (%) | SCT (g a.c./ha) | SCT h.e. (%) | PYR + SCT (g a.c. PYR† + g a.c. SCT‡) | PYR + SCT h.e. (%) | Colby h.e.(%) |
|---|---|---|---|---|---|---|---|
| VERPE a/ | 300 | 10 | 300 | 83 | 300† + 300‡ | 84 | 84.7 |
| 7 DAA/ | 450 | 15 | 450 | 80 | 300† + 450‡ | 95 | 82 |
|  | 600 | 10 |  |  | 600† + 300‡ | 96 | 84.7 |
|  |  |  |  |  | 600† + 450‡ | 98 | 82 |
|  |  |  |  |  | 450† + 300‡ | 93 | 85.55 |
|  |  |  |  |  | 450† + 450‡ | 94 | 83 |
| SOLNI b/ | 300 | 10 | 300 | 53 | 300† + 300‡ | 100 | 57.7 |
| 7 DAA/ | 450 | 10 | 450 | 53 | 300† + 450‡ | 95 | 57.7 |
|  | 600 | 28 |  |  | 600† + 300‡ | 98 | 66.16 |
|  |  |  |  |  | 600† + 450‡ | 100 | 66.16 |
|  |  |  |  |  | 450† + 300‡ | 100 | 57.7 |
|  |  |  |  |  | 450† + 450‡ | 98 | 57.7 |
| GERDI c/ | 300 | 15 | 300 | 28 | 300† + 300‡ | 50 | 38.8 |
| 7 DAA/ | 450 | 30 | 450 | 50 | 300† + 450‡ | 55 | 57.5 |
|  | 600 | 15 |  |  | 600† + 300‡ | 73 | 38.8 |
|  |  |  |  |  | 600† + 450‡ | 65 | 57.5 |
|  |  |  |  |  | 450† + 300‡ | 60 | 49.6 |
|  |  |  |  |  | 450† + 450‡ | 68 | 65 |
| MATCH d/ | 300 | 0 | 300 | 28 | 300† + 300‡ | 35 | 28 |
| 7 DAA/ | 450 | 0 | 450 | 25 | 300† + 450‡ | 75 | 25 |
|  | 600 | 0 |  |  | 600† + 300‡ | 40 | 28 |
|  |  |  |  |  | 600† + 450‡ | 78 | 25 |
|  |  |  |  |  | 450† + 300‡ | 28 | 28 |
|  |  |  |  |  | 450† + 450‡ | 38 | 25 |
| ECHCG e/ | 300 | 0 | 300 | 58 | 300† + 300‡ | 85 | 58 |
| 7 DAA/ | 450 | 0 | 450 | 60 | 300† + 450‡ | 91 | 60 |
|  | 600 | 0 |  |  | 600† + 300‡ | 93 | 58 |
|  |  |  |  |  | 600† + 450‡ | 98 | 60 |
|  |  |  |  |  | 450† + 300‡ | 95 | 58 |
|  |  |  |  |  | 450† + 450‡ | 90 | 60 |
| DIGSA f/ | 300 | 0 | 300 | 60 | 300† + 300‡ | 95 | 60 |
| 7 DAA/ | 450 | 0 | 450 | 53 | 300† + 450‡ | 98 | 53 |
|  | 600 | 5 |  |  | 600† + 300‡ | 94 | 62 |
|  |  |  |  |  | 600† + 450‡ | 99 | 55.35 |
|  |  |  |  |  | 450† + 300‡ | 73 | 60 |
|  |  |  |  |  | 450† + 450‡ | 98 | 53 |
| POAAN g/ | 300 | 2 | 300 | 3 | 300† + 300‡ | 2 | 4.94 |
| 7 DAA/ | 450 | 2 | 450 | 3 | 300† + 450‡ | 12 | 4.94 |
|  | 600 | 0 |  |  | 600† + 300‡ | 20 | 3 |
|  |  |  |  |  | 600† + 450‡ | 50 | 3 |
|  |  |  |  |  | 450† + 300‡ | 20 | 4.94 |
|  |  |  |  |  | 450† + 450‡ | 32 | 4.94 |
| CHEAL h/ | 300 | 3 | 300 | 30 | 300† + 300‡ | 91 | 32.1 |
| 7 DAA/ | 450 | 10 | 450 | 45 | 300† + 450‡ | 96 | 46.65 |
|  | 600 | 22 |  |  | 600† + 300‡ | 96 | 45.4 |
|  |  |  |  |  | 600† + 450‡ | 97 | 57.1 |
|  |  |  |  |  | 450† + 300‡ | 98 | 37 |
|  |  |  |  |  | 450† + 450‡ | 98 | 50.5 |
| SETVE i/ | 300 | 10 | 300 | 2 | 300† + 300‡ | 15 | 11.8 |
| 7 DAA/ | 450 | 7 | 450 | 2 | 300† + 450‡ | 20 | 11.8 |
|  | 600 | 10 |  |  | 600† + 300‡ | 22 | 11.8 |
|  |  |  |  |  | 600† + 450‡ | 45 | 11.8 |

TABLE 7-continued

Test results of Example 7, showing herbicidal effect (h.e.) against different types of unwanted vegetation (UVEG) of a herbicide composition according to the first aspect of the present invention comprising pyridate (PYR) and sulcotrione (SCT), named 'PYR + SCT', compared with herbicide compositions comprising PYR or SCT individually. Shown data are average values of 1-14 trials. Synergistic effect of 'PYR + SCT' is evaluated by comparison against the expected h.e. of the combination of the active compounds calculated according to the calculation method by Colby given above

| UVEG/ DAA* | PYR (g a.c.**/ ha) | PYR h.e. (%) | SCT (g a.c./ha) | SCT h.e. (%) | PYR + SCT (g a.c. PYR† + g a.c. SCT‡) | PYR + SCT h.e. (%) | Colby h.e.(%) |
|---|---|---|---|---|---|---|---|
| | | | | | 450† + 300‡ | 27 | 8.86 |
| | | | | | 450† + 450‡ | 15 | 8.86 |

*DAA = days after application;
**a.c. = active compound;
<sup>a</sup> VERPE = *Veronica persica*;
<sup>b</sup> SOLNI = *Solanum nigrum*;
<sup>c</sup> GERDI = *Geranium dissectum*;
<sup>d</sup> MATCH = *Matricaria chamomilla*;
<sup>e</sup> ECHCG = *Echinochloa crus-galli*;
<sup>f</sup> DIGSA = *Digitaria sanguinalis*;
<sup>g</sup> POAAN = *Poa annua*;
<sup>h</sup> CHEAL = *Chenopodium album*;
<sup>i</sup> SETVE = *Setaria verticillata*.

TABLE 8

Test results of Example 8, showing herbicidal effect (h.e.) against different types of unwanted vegetation (UVEG) of a herbicide composition according to the first aspect of the present invention comprising as active ingredient (AI): pyridate (PYR) and mesotrione (MES), named 'PYR + MES'; pyridate (PYR) and S-metolachlor (SMO), named 'PYR + SMO'; pyridate (PYR) and nicosulfuron (NIC), named 'PYR + NIC'; pyridate (PYR), mesotrione (MES) and S-metolachlor (SMO), named 'PYR + MES + SMO'; pyridate (PYR), mesotrione (MES) and nicosulfuron (NIC), named 'PYR + MES + NIC'; and compared with herbicide compositions comprising PYR or MES or SMO or NIC individually. Shown data are average values of 1-14 trials. Synergistic effects of 'PYR + MES', 'PYR + SMO', 'PYR + NIC' is evaluated by comparison against the expected h.e. of the combination of the active compounds calculated according to the calculation method by Colby given above, while 'PYR + MES + SMO' and 'PYR + MES + NIC' are calculated by a three-way calculation of Colby. Notifications used: A: PYR + MES (g a.c. PYR† + g a.c. MES‡); B: PYR + SMO(g a.c. PYR† + g a.c. SMO<sup>∞</sup>) and C: PYR + NIC (g a.c. PYR† + g a.c. NIC<sup>Δ</sup>).

| UVEG/ DAA* | AI (g a.c.**/ha) | AI h.e. (%) | A, B, C (g a.c. PYR† + g a.c. MES‡ or SMO<sup>∞</sup> or NIC<sup>Δ</sup>) | A, B, C h.e. (%) | Colby h.e. (%) |
|---|---|---|---|---|---|
| VERPE <sup>a</sup>/ 7 DAA/ | PYR (300) | 8 | 300† + 80‡ | 97 | 60.4 |
| | MES (80) | 57 | 300† + 50‡ | 95 | 38.4 |
| | MES (50) | 33 | 300† + 800<sup>∞</sup> | 20 | 12.6 |
| | SMO (800) | 5 | 300† + 30<sup>Δ</sup> | 12 | 14.4 |
| | NIC (30) | 7 | | | |
| SOLNI <sup>b</sup>/ 7 DAA/ | PYR (300) | 11 | 300† + 80‡ | 100 | 59.1 |
| | MES (80) | 54 | 300† + 50‡ | 100 | 70.6 |
| | MES (50) | 67 | 300† + 800<sup>∞</sup> | 15 | 13.7 |
| | SMO (800) | 3 | 300† + 30<sup>Δ</sup> | 11 | 26.1 |
| | NIC (30) | 17 | | | |
| GERDI <sup>c</sup>/ 7 DAA/ | PYR (300) | 5 | 300† + 80‡ | 33 | 19.3 |
| | MES (80) | 15 | 300† + 50‡ | 23 | 19.3 |
| | MES (50) | 15 | 300† + 800<sup>∞</sup> | 5 | 5 |
| | SMO (800) | 0 | 300† + 30<sup>Δ</sup> | 10 | 36.4 |
| | NIC (30) | 33 | | | |
| MATCH <sup>d</sup>/ 7 DAA/ | PYR (300) | 0 | 300† + 80‡ | 98 | 53 |
| | MES (80) | 53 | 300† + 50‡ | 70 | 25 |
| | MES (50) | 25 | 300† + 800<sup>∞</sup> | 0 | 0 |
| | SMO (800) | 0 | 300† + 30<sup>Δ</sup> | 3 | 6 |
| | NIC (30) | 6 | | | |
| SETVE <sup>e</sup>/ 7 DAA/ | PYR (300) | 0 | 300† + 80‡ | 9 | 3 |
| | MES (80) | 3 | 300† + 50‡ | 7 | 0 |
| | MES (50) | 0 | 300† + 800<sup>∞</sup> | 0 | 0 |
| | SMO (800) | 0 | 300† + 30<sup>Δ</sup> | 15 | 37 |
| | NIC (30) | 37 | | | |
| DIGSA <sup>f</sup>/ 7 DAA/ | PYR (300) | 0 | 300† + 80‡ | 97 | 92 |
| | MES (80) | 92 | 300† + 50‡ | 97 | 95 |
| | MES (50) | 95 | 300† + 800<sup>∞</sup> | 0 | 0 |
| | SMO (800) | 0 | 300† + 30<sup>Δ</sup> | 13 | 32 |
| | NIC (30) | 32 | | | |
| ECHCG <sup>g</sup>/ 7 DAA/ | PYR (300) | 0 | 300† + 80‡ | 94 | 73 |
| | MES (80) | 73 | 300† + 50‡ | 85 | 70 |
| | MES (50) | 70 | 300† + 800<sup>∞</sup> | 0 | 0 |
| | SMO (800) | 0 | 300† + 30<sup>Δ</sup> | 18 | 38 |
| | NIC (30) | 38 | | | |
| POAAN <sup>h</sup>/ 7 DAA/ | PYR (300) | 3 | 300† + 80‡ | 5 | 5.9 |
| | MES (80) | 3 | 300† + 50‡ | 2 | 3 |

TABLE 8-continued

Test results of Example 8, showing herbicidal effect (h.e.) against different types of unwanted vegetation (UVEG) of a herbicide composition according to the first aspect of the present invention comprising as active ingredient (AI): pyridate (PYR) and mesotrione (MES), named 'PYR + MES'; pyridate (PYR) and S-metolachlor (SMO), named 'PYR + SMO'; pyridate (PYR) and nicosulfuron (NIC), named 'PYR + NIC'; pyridate (PYR), mesotrione (MES) and S-metolachlor (SMO), named 'PYR + MES + SMO'; pyridate (PYR), mesotrione (MES) and nicosulfuron (NIC), named 'PYR + MES + NIC'; and compared with herbicide compositions comprising PYR or MES or SMO or NIC individually. Shown data are average values of 1-14 trials. Synergistic effects of 'PYR + MES', 'PYR + SMO', 'PYR + NIC' is evaluated by comparison against the expected h.e. of the combination of the active compounds calculated according to the calculation method by Colby given above, while 'PYR + MES + SMO' and 'PYR + MES + NIC' are calculated by a three-way calculation of Colby. Notifications used: A: PYR + MES (g a.c. PYR† + g a.c. MES‡); B: PYR + SMO(g a.c. PYR† + g a.c. SMO∞) and C: PYR + NIC (g a.c. PYR† + g a.c. NICᐃ).

| UVEG/ DAA* | AI (g a.c.**/ha) | AI h.e. (%) | A, B, C (g a.c. PYR† + g a.c. MES‡ or SMO∞ or NICᐃ) | A, B, C h.e. (%) | Colby h.e. (%) |
|---|---|---|---|---|---|
| | MES (50) | 0 | 300† + 800∞ | 2 | 3 |
| | SMO (800) | 0 | 300† + 30ᐃ | 11 | 75.6 |
| | NIC (30) | 75 | | | |
| CHEAL i/ | PYR (300) | 6 | 300† + 80‡ | 96 | 92.5 |
| 7 DAA/ | MES (80) | 92 | 300† + 50‡ | 8 | 78.4 |
| | MES (50) | 77 | 300† + 800∞ | 97 | 6.9 |
| | SMO (800) | 1 | 300† + 30ᐃ | 7 | 28.6 |
| | NIC (30) | 24 | | | |

DAA = days after application;
**a.c. = active compound;
a VERPE = Veronica persica;
b SOLNI = Solanum nigrum;
c GERDI = Geranium dissectum;
d MATCH = Matricaria chamomilla;
e SETVE = Setaria verticillata;
f DIGSA = Digitaria sanguinalis;
g ECHCG = Echinochloa crus-galli;
h POAAN = Poa annua;
i CHEAL = Chenopodium album.

TABLE 9

Test results of Example 8, showing herbicidal effect (h.e.) against different types of unwanted vegetation (UVEG) of a herbicide composition according to the first aspect of the present invention comprising as active ingredient (AI): pyridate (PYR), mesotrione (MES) and S-metolachlor (SMO), named 'PYR + MES + SMO'; pyridate (PYR), mesotrione (MES) and nicosulfuron (NIC), named 'PYR + MES + NIC'; and compared with herbicide compositions comprising PYR or MES or SMO or NIC individually. Shown data are average values of 1-14 trials. 'PYR + MES + SMO' and 'PYR + MES + NIC' are calculated by a three-way calculation of Colby.

| UVEG/ DAA* | AI (g a.c.**/ha) | AI h.e. (%) | A, B, C (g a.c. PYR† + g a.c. MES‡ or SMO∞ or NICᐃ) | A, B h.e. (%) | Colby h.e. (%) |
|---|---|---|---|---|---|
| VERPE a/ | PYR (300) | 8 | 300† + 80‡ + 800∞ | 99 | 62.4 |
| 7 DAA/ | MES (80) | 57 | 300† + 50‡ + 30ᐃ | 97 | 42.7 |
| | MES (50) | 33 | | | |
| | SMO (800) | 5 | | | |
| | NIC (30) | 7 | | | |
| SOLNI b/ | PYR (300) | 11 | 300† + 80‡ + 800∞ | 100 | 60.3 |
| 7 DAA/ | MES (80) | 54 | 300† + 50‡ + 30ᐃ | 100 | 75.6 |
| | MES (50) | 67 | | | |
| | SMO (800) | 3 | | | |
| | NIC (30) | 17 | | | |
| GERDI c/ | PYR (300) | 5 | 300† + 80‡ + 800∞ | 38 | 19.3 |
| 7 DAA/ | MES (80) | 15 | 300† + 50‡ + 30ᐃ | 28 | 45.9 |

TABLE 9-continued

Test results of Example 8, showing herbicidal effect (h.e.) against different types of unwanted vegetation (UVEG) of a herbicide composition according to the first aspect of the present invention comprising as active ingredient (AI): pyridate (PYR), mesotrione (MES) and S-metolachlor (SMO), named 'PYR + MES + SMO'; pyridate (PYR), mesotrione (MES) and nicosulfuron (NIC), named 'PYR + MES + NIC'; and compared with herbicide compositions comprising PYR or MES or SMO or NIC individually. Shown data are average values of 1-14 trials. 'PYR + MES + SMO' and 'PYR + MES + NIC' are calculated by a three-way calculation of Colby.

| UVEG/ DAA* | AI (g a.c.**/ha) | AI h.e. (%) | A, B, C (g a.c. PYR† + g a.c. MES‡ or SMO∞ or NICᐃ) | A, B h.e. (%) | Colby h.e. (%) |
|---|---|---|---|---|---|
| | MES (50) | 15 | | | |
| | SMO (800) | 0 | | | |
| | NIC (30) | 33 | | | |
| MATCH d/ | PYR (300) | 0 | 300† + 80‡ + 800∞ | 83 | 53 |
| 7 DAA/ | MES (80) | 53 | 300† + 50‡ + 30ᐃ | 95 | 29.5 |
| | MES (50) | 25 | | | |
| | SMO (800) | 0 | | | |
| | NIC (30) | 6 | | | |
| SETVE e/ | PYR (300) | 0 | 300† + 80‡ + 800∞ | 12 | 3 |
| 7 DAA/ | MES (80) | 3 | 300† + 50‡ + 30ᐃ | 92 | 37 |
| | MES (50) | 0 | | | |
| | SMO (800) | 0 | | | |
| | NIC (30) | 37 | | | |
| DIGSA f/ | PYR (300) | 0 | 300† + 80‡ + 800∞ | 97 | 92 |
| 7 DAA/ | MES (80) | 92 | 300† + 50‡ + 30ᐃ | 92 | 96.6 |
| | MES (50) | 95 | | | |
| | SMO (800) | 0 | | | |
| | NIC (30) | 32 | | | |
| ECHCG g/ | PYR (300) | 0 | 300† + 80‡ + 800∞ | 98 | 73 |
| 7 DAA/ | MES (80) | 73 | 300† + 50‡ + 30ᐃ | 78 | 81.4 |
| | MES (50) | 70 | | | |
| | SMO (800) | 0 | | | |
| | NIC (30) | 38 | | | |
| POAAN h/ | PYR (300) | 3 | 300† + 80‡ + 800∞ | 9 | 5.9 |
| 7 DAA/ | MES (80) | 3 | 300† + 50‡ + 30ᐃ | 39 | 75.8 |
| | MES (50) | 0 | | | |
| | SMO (800) | 0 | | | |
| | NIC (30) | 75 | | | |
| CHEAL i/ | PYR (300) | 6 | 300† + 80‡ + 800∞ | 97 | 92.6 |
| 7 DAA/ | MES (80) | 92 | 300† + 50‡ + 30ᐃ | 95 | 83.6 |
| | MES (50) | 77 | | | |
| | SMO (800) | 1 | | | |
| | NIC (30) | 24 | | | |

Synergistic actions are observed for the herbicide combinations of Examples 1-5, as shown in Table 1-5. When taking into account the observed synergistic actions, the environmental loading will be less when applying tank mixtures of pyridate and at least one 4-HPPD inhibitor compared to applying individual compositions comprising only one of said herbicides.

The invention claimed is:

1. A synergistically effective herbicide composition comprising as component (A) an herbicidally active amount of pyridate and as component (B) at least one 4-HPPD inhibitor selected from the group consisting of tolpyralate and topramezone, wherein a weight ratio of pyridate to tolpyralate is 7.5:1 to 22.5:1 and a weight ratio of pyridate to topramezone is 36:1 to 72.5:1.

2. The herbicide composition according to claim 1, further comprising one or more additional components selected from the group comprising other pesticides such as herbicides, insecticides, fungicides, biocides or other active pesticide ingredients, safeners, antioxidants, chemical stabilizers, adhesives, fertilizers, perfumes, colorants, liquid carriers, solid carriers, surface-active agents, crystallisation inhibitors, viscosity modifiers, suspending agents, spray droplet modifiers, pigments, foaming agents, light-blocking agents, compatibility agents, antifoam agents, sequestering agents, neutralising agents and buffers, wetting and dispersing agents, preservatives, thickening agents, corrosion inhibitors, freezing point depressants, odorants, spreading agents, penetration aids, micronutrients, emollients, lubricants, sticking agents and humectants.

3. Kit comprising one or more spatially separated components to be used as a herbicide composition, comprising as component (A) an herbicidally active amount of pyridate and as component (B) at least one 4-HPPD inhibitor selected from the group consisting of tolpyralate and topramezone, wherein a weight ratio of pyridate to tolpyralate is 7.5:1 to 22.5:1 and a weight ratio of pyridate to topramezone is 36:1 to 72.5:1, which components are for simultaneous, separate or sequential use.

4. A method for controlling undesirable vegetation, the method comprising:
providing a synergistically effective herbicide composition in an amount effective for controlling unwanted vegetation, the herbicide composition comprising
as component (A) an herbicidally active amount of pyridate and as component (B) at least one 4-HPPD inhibitor selected from the group consisting of tolpyralate and topramezone, wherein a weight ratio of pyridate to tolpyralate is 7.5:1 to 22.5:1 and a weight ratio of pyridate to topramezone is 36:1 to 72.5:1; and
applying the herbicide composition to the unwanted vegetation and/or a habitat thereof.

5. The method of claim 4, wherein said herbicide composition is applied onto said one or more types of unwanted vegetation shortly before, around or after emergence of one or more crop types in proximity of said unwanted vegetation, wherein the herbicide composition is reapplied at a specified time interval of 1 day to 50 days until harvest of said one or more crop types.

6. The method of claim 5, wherein maize is selected as a crop.

7. The method of claim 4, wherein said herbicide composition is applied by spraying, sprinkling, showering, spritzing, spreading in droplets, watering, atomizing, spattering, dispersing, diffusing, broadcasting and/or douching.

8. The method of claim 4, wherein said herbicide composition is applied as a tank mixture, wherein the pyridate and tolpyralate or pyridate and topramezone are combined prior to use.

* * * * *